US012758073B2

(12) United States Patent
Shim et al.

(10) Patent No.: US 12,758,073 B2
(45) Date of Patent: Oct. 13, 2026

(54) ROBOT CLEANER WITH GRAPHICAL USER INTERFACE FOR WATER SETTINGS

(71) Applicant: LG ELECTRONICS INC., Seoul (KR)

(72) Inventors: Inbo Shim, Seoul (KR); Byeongju Kim, Seoul (KR); Jeonghwan Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 317 days.

(21) Appl. No.: 18/014,239

(22) PCT Filed: Jun. 18, 2021

(86) PCT No.: PCT/KR2021/007672

§ 371 (c)(1),
(2) Date: Jan. 3, 2023

(87) PCT Pub. No.: WO2022/005067

PCT Pub. Date: Jan. 6, 2022

(65) Prior Publication Data

US 2023/0255430 A1 Aug. 17, 2023

(30) Foreign Application Priority Data

Jul. 1, 2020 (KR) ........................ 10-2020-0080837

(51) Int. Cl.
*A47L 11/40* (2006.01)
*A47L 11/282* (2006.01)
(Continued)

(52) U.S. Cl.
CPC ......... *A47L 11/4011* (2013.01); *A47L 11/282* (2013.01); *A47L 11/4038* (2013.01); *A47L 11/4069* (2013.01); *A47L 11/4083* (2013.01); *A47L 11/4088* (2013.01); *G08B 21/18* (2013.01); *A47L 2201/06* (2013.01); *G06F 3/04847* (2013.01); *G06F 3/0488* (2013.01)

(58) Field of Classification Search
CPC .............. A47L 11/4011; A47L 11/4083; A47L 11/4088; A47L 2201/06; G06F 3/048;
(Continued)

(56) References Cited

U.S. PATENT DOCUMENTS 10,241,527 B2 * 3/2019 Fadell ...................... F24F 11/30
2016/0062618 A1 * 3/2016 Fagan .................. G06F 3/0488 715/772
2019/0038103 A1 * 2/2019 Jang ........................ A47L 11/24

FOREIGN PATENT DOCUMENTS

CN 105744874 A 7/2016
CN 106998981 A 8/2017
(Continued)

*Primary Examiner* — C. A. Rivera
(74) *Attorney, Agent, or Firm* — Birch, Stewart, Kolasch & Birch, LLP

(57) ABSTRACT

Disclosed are a robot cleaner capable of controlling a water pump of a robot cleaner by a user input through an external control device, a robot cleaning system having the same, and a control method of the robot cleaning system. According to the present invention, user convenience is increased since the amount of water supplied to the mop of the robot cleaner can be controlled according to a cleaning environment, cleaning efficiency is improved by controlling the water pump to quickly wet the mop of the robot cleaner at the beginning of a cleaning operation, and the robot cleaner can be hygienically managed since a user controls the water pump to discharge residual water inside the robot cleaner.

20 Claims, 22 Drawing Sheets

(51) Int. Cl.
*G06F 3/04847* (2022.01)
*G06F 3/0488* (2022.01)
*G08B 21/18* (2006.01) .

(58) Field of Classification Search
CPC .. G06F 3/0484; G06F 3/0485; G06F 3/04855; G06F 3/04847; G06F 3/03548; G06F 3/0362; G06F 1/1692
See application file for complete search history.

(56) References Cited

FOREIGN PATENT DOCUMENTS

| | | | | | |
|---|---|---|---|---|---|
| CN | 109330504 | A | | 2/2019 | |
| CN | 110604520 | A | | 12/2019 | |
| CN | 111345742 | A | | 6/2020 | |
| CN | 111345742 | B | | 3/2022 | |
| JP | 2014181051 | A | * | 9/2014 | |
| KR | 10-2017-0048815 | A | | 5/2017 | |
| KR | 10-2019-0015930 | A | | 2/2019 | |
| KR | 10-2019-0088691 | A | | 7/2019 | |
| KR | 10-2054689 | B1 | | 1/2020 | |
| KR | 10-2080523 | B1 | | 4/2020 | |
| TW | 201838578 | A | | 11/2018 | |
| TW | 201907853 | A | | 3/2019 | |
| TW | 201947337 | A | | 12/2019 | |
| WO | WO 2019/083836 | A1 | | 5/2019 | |
| WO | WO-2020024489 | A1 | * | 2/2020 | .............. A47L 11/28 |
| WO | WO-2020080769 | A1 | * | 4/2020 | ............. A47L 9/009 |

* cited by examiner

[FIG. 1]
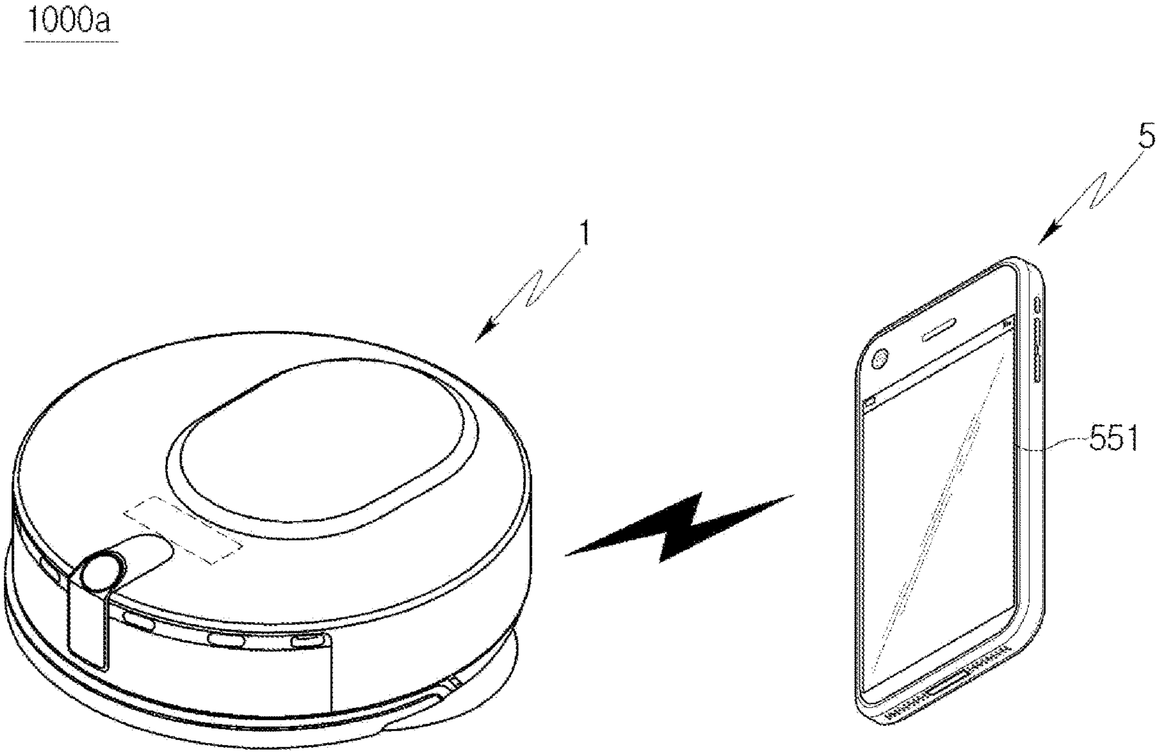

[FIG. 2a]
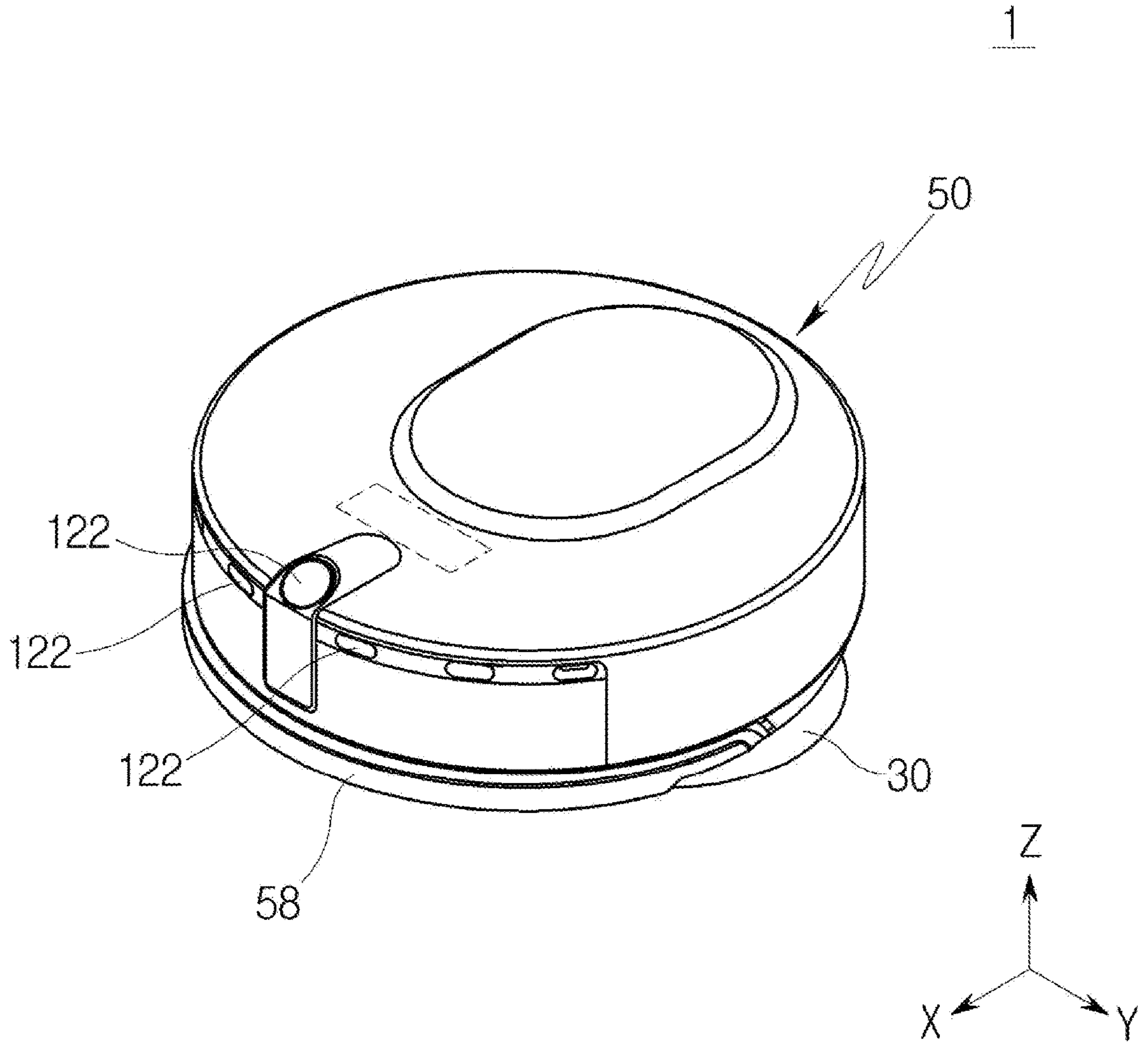

[FIG. 2b]
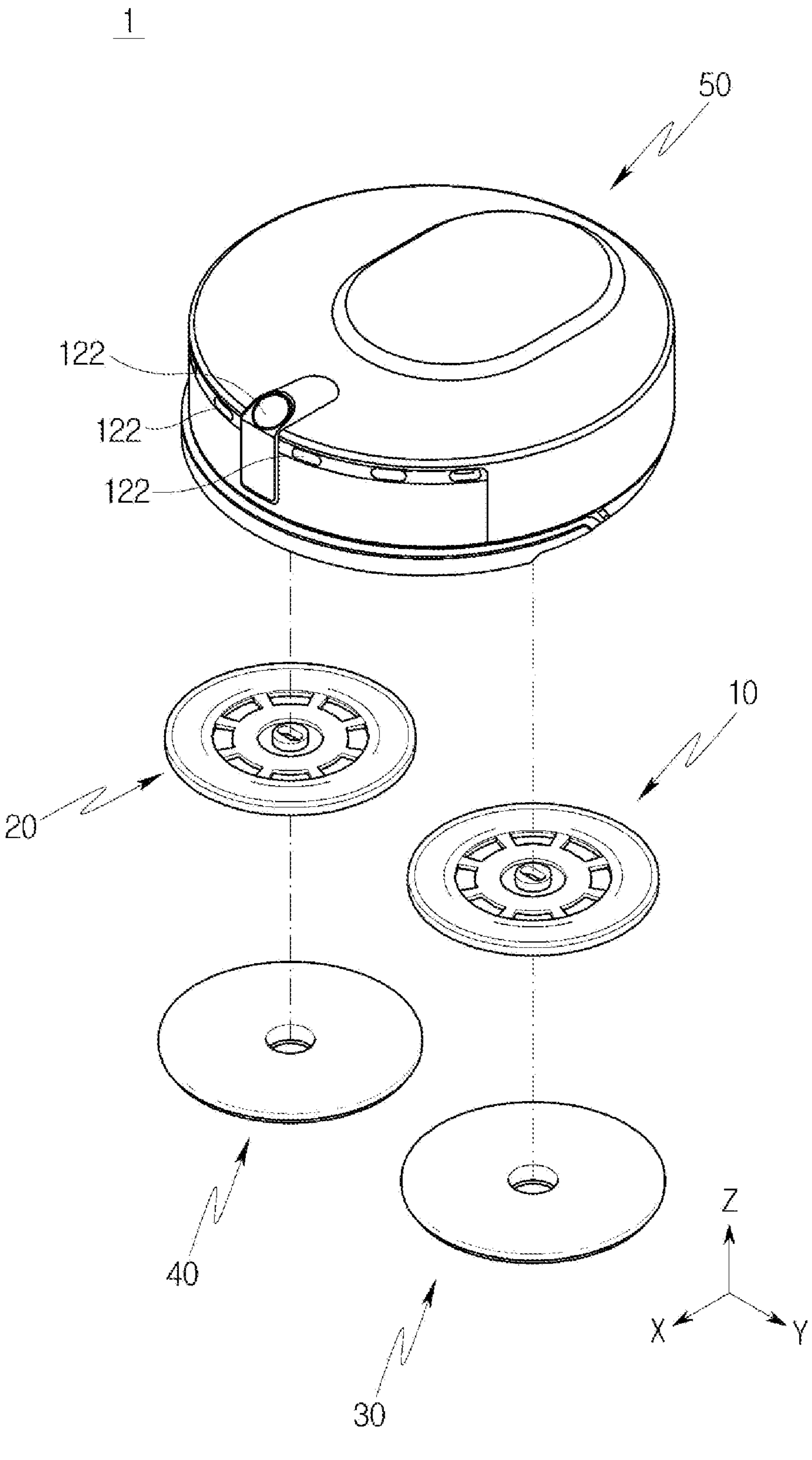

[FIG. 2c]
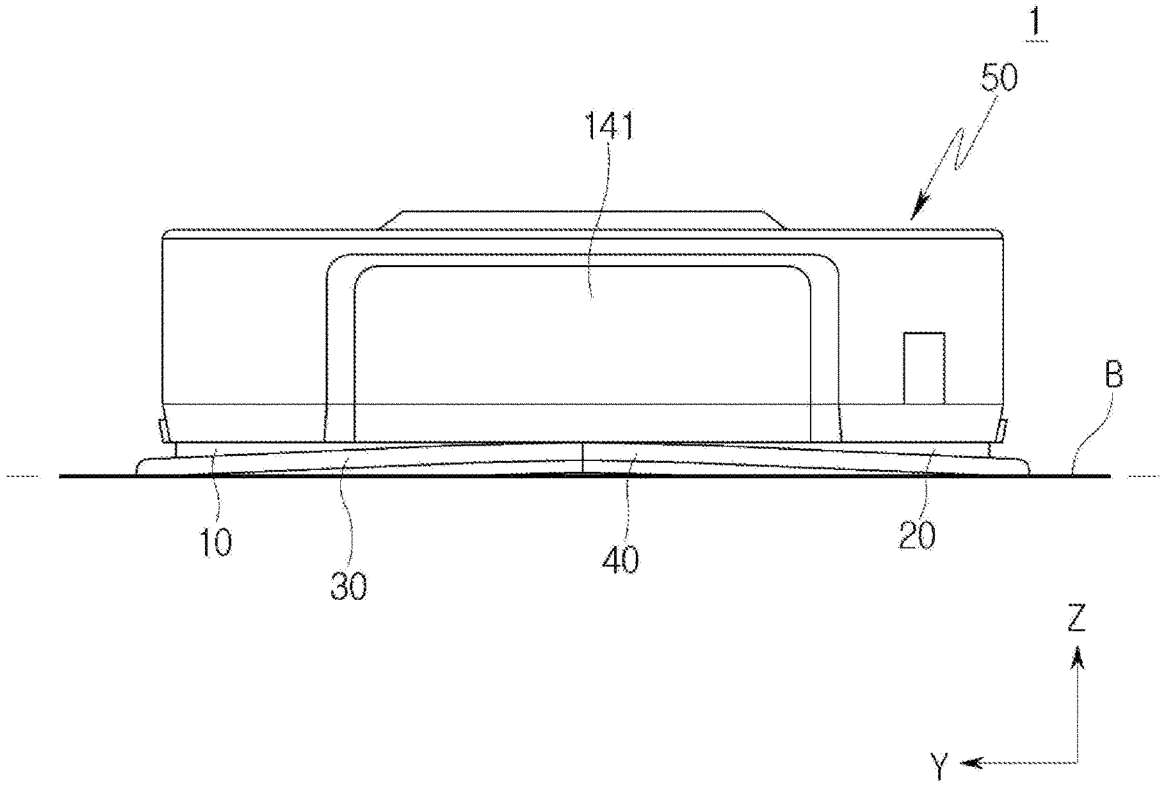

[FIG. 2d]
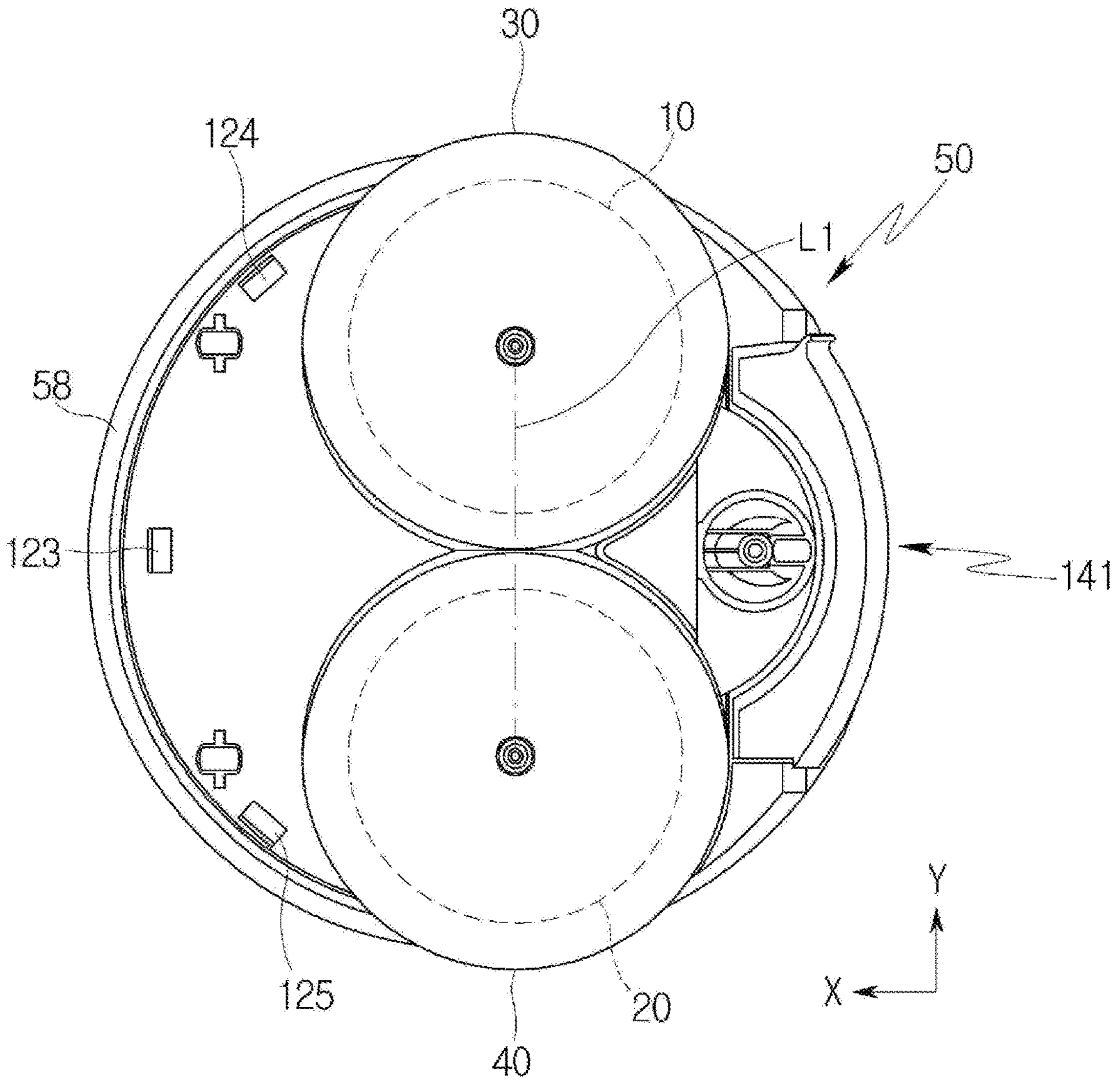

[FIG. 2e]
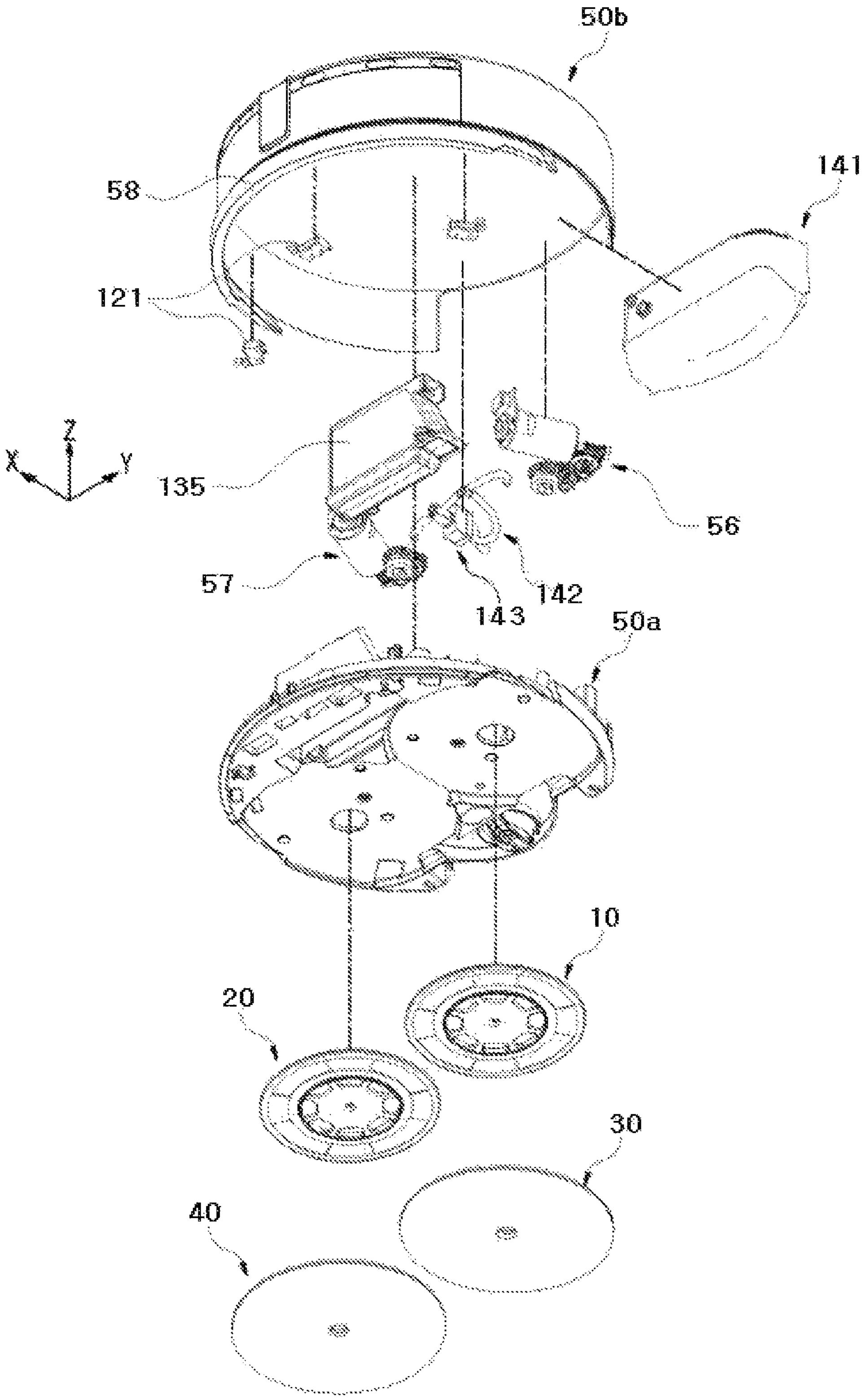

[FIG. 2f]
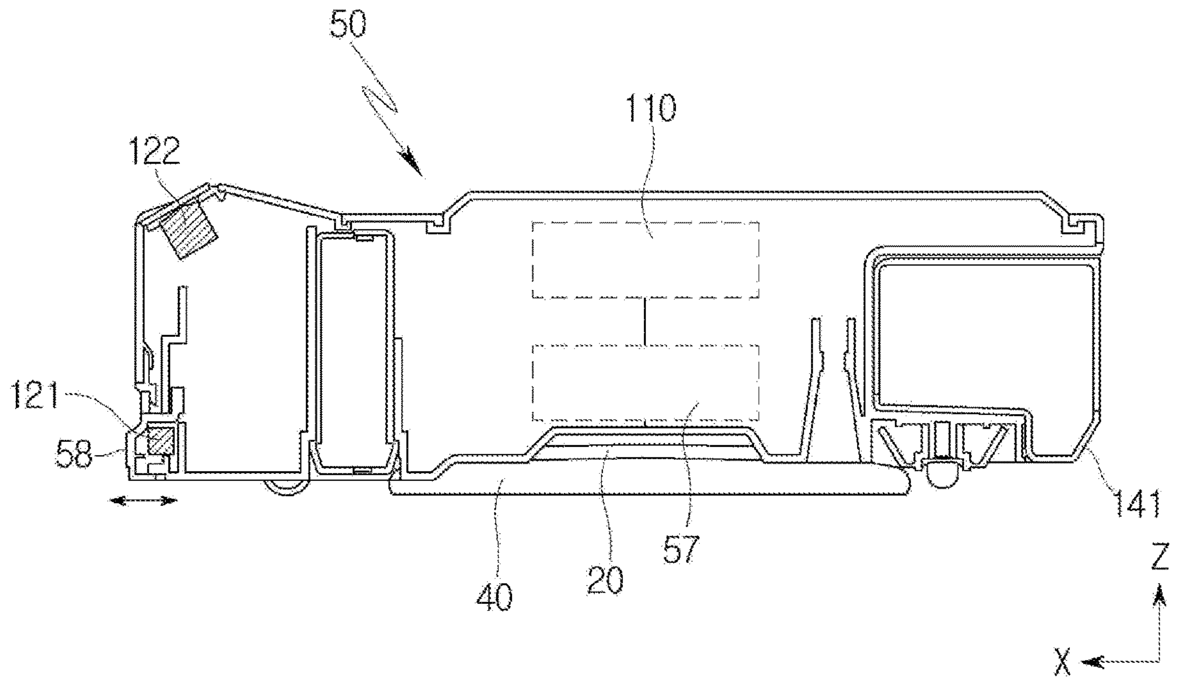

[FIG. 3]
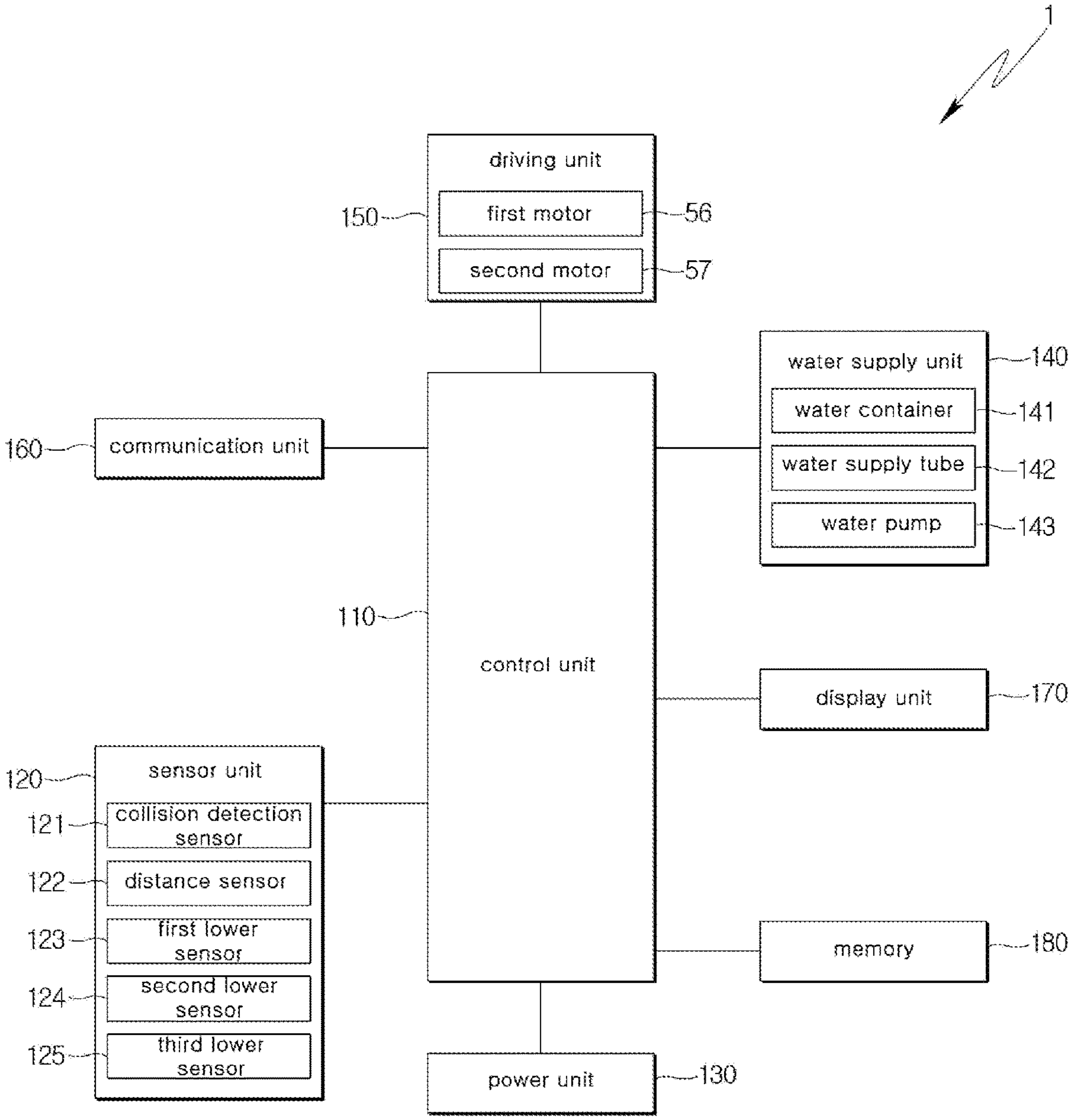

[FIG. 4]
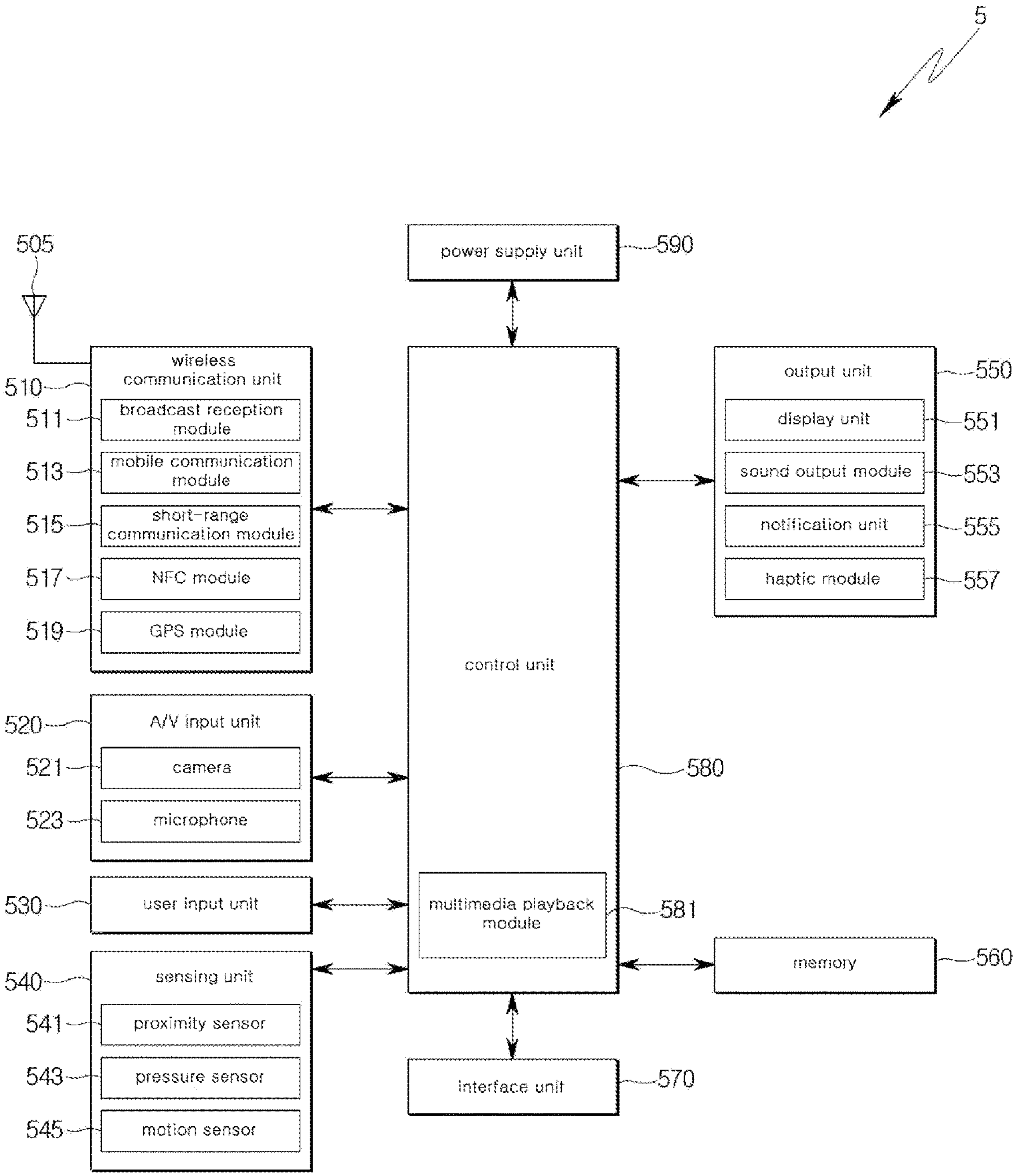

[FIG. 5a]
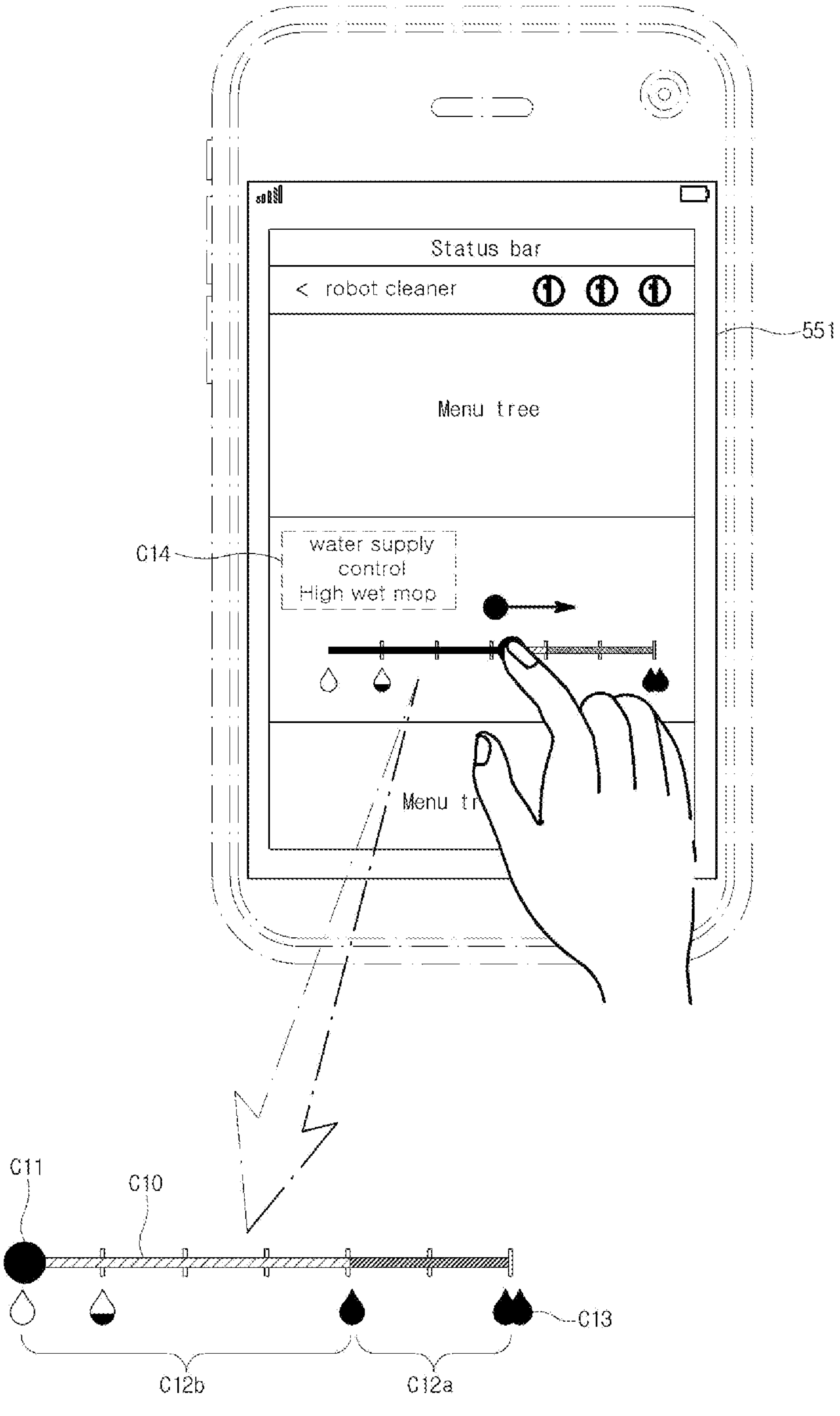

[FIG. 5b]
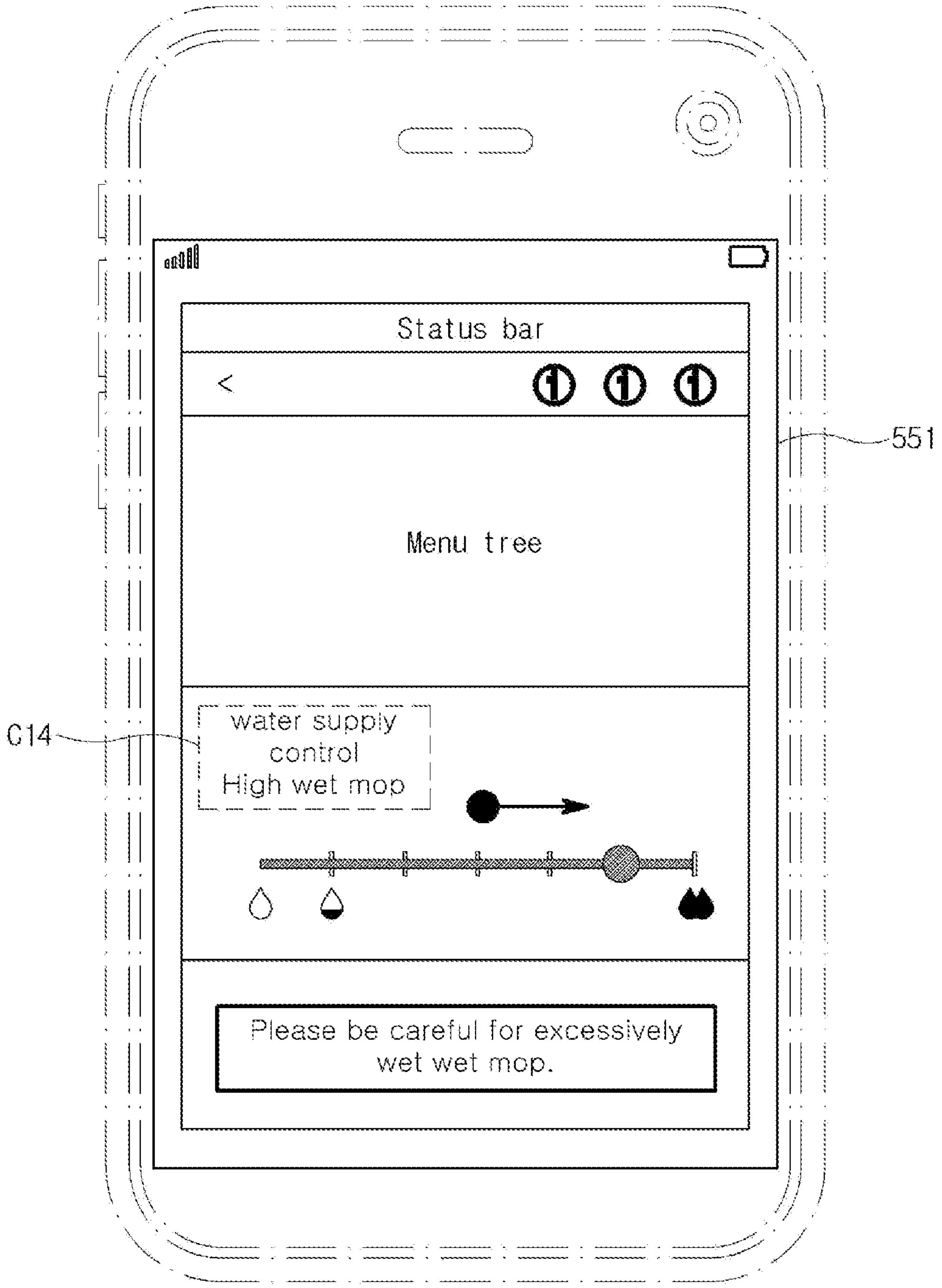

[FIG. 6]
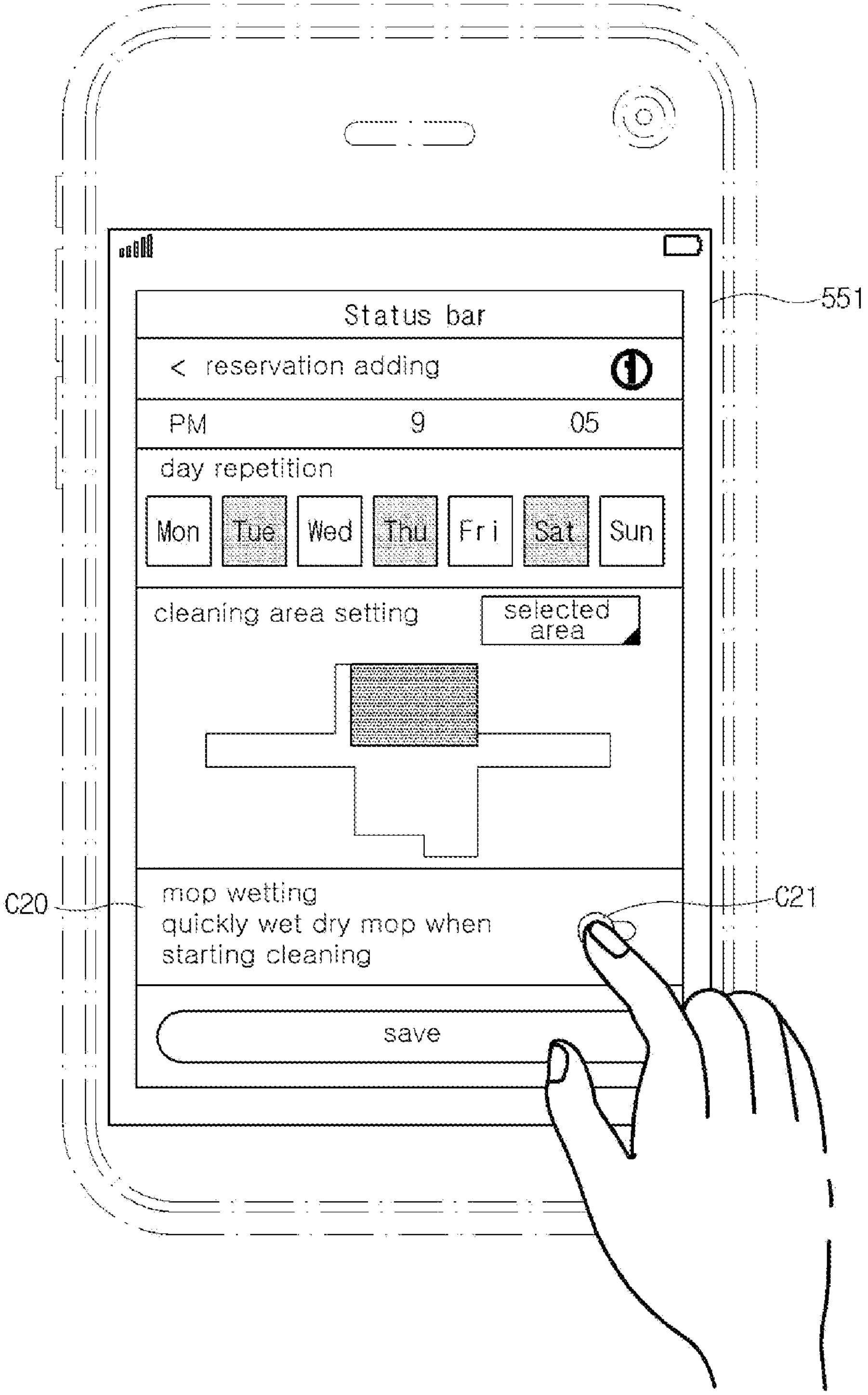

[FIG. 7a]
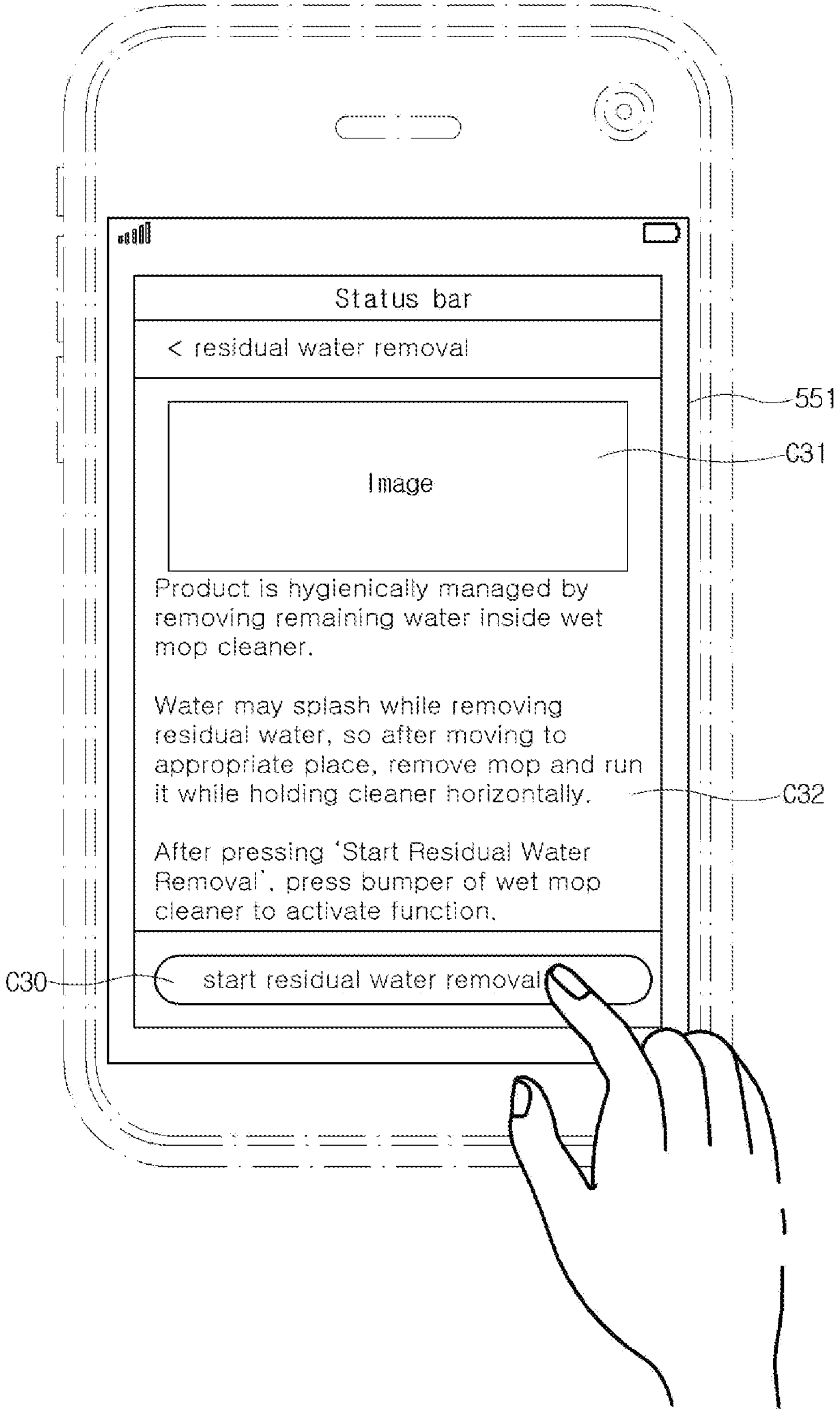

[FIG. 7b]
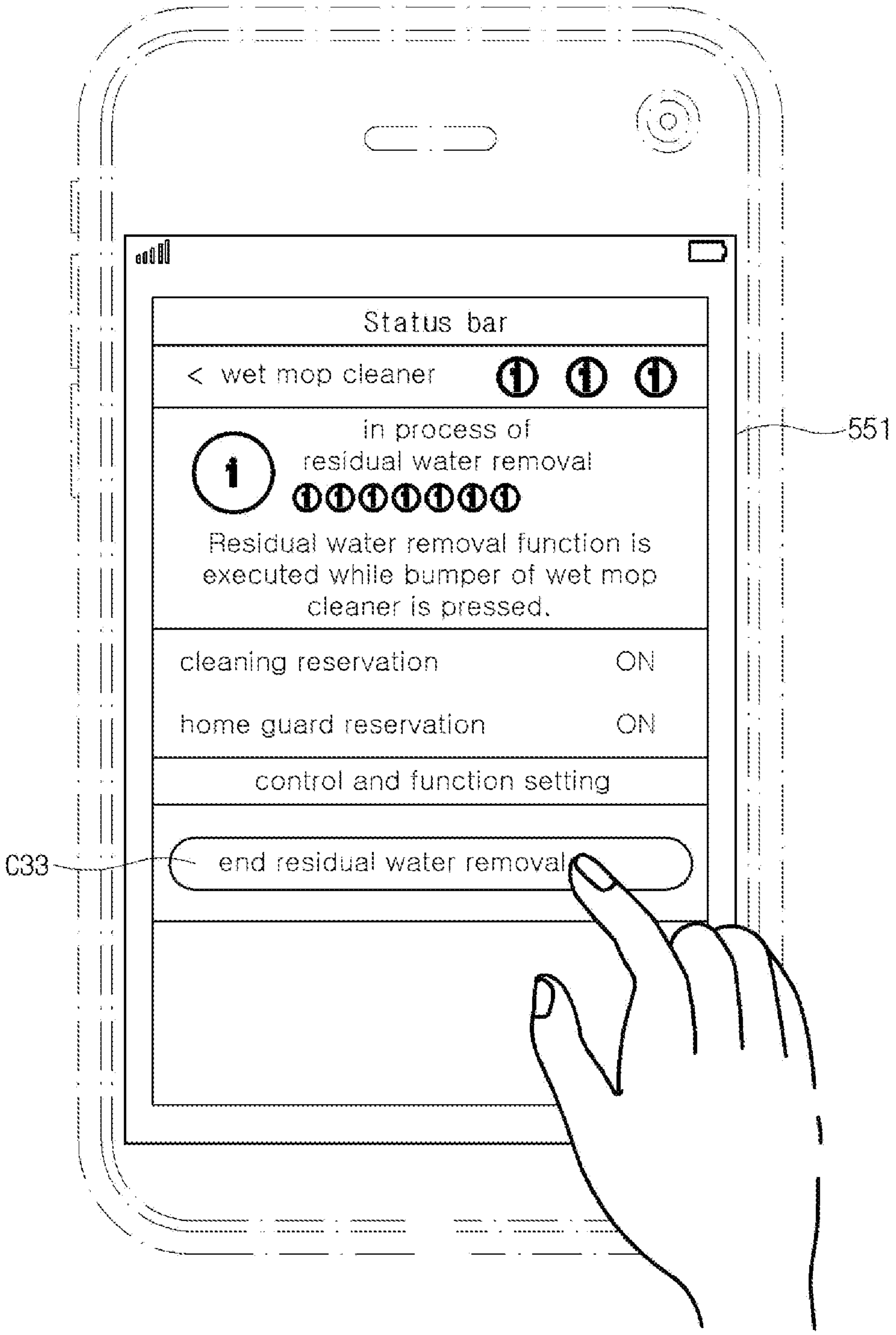

[FIG. 8]
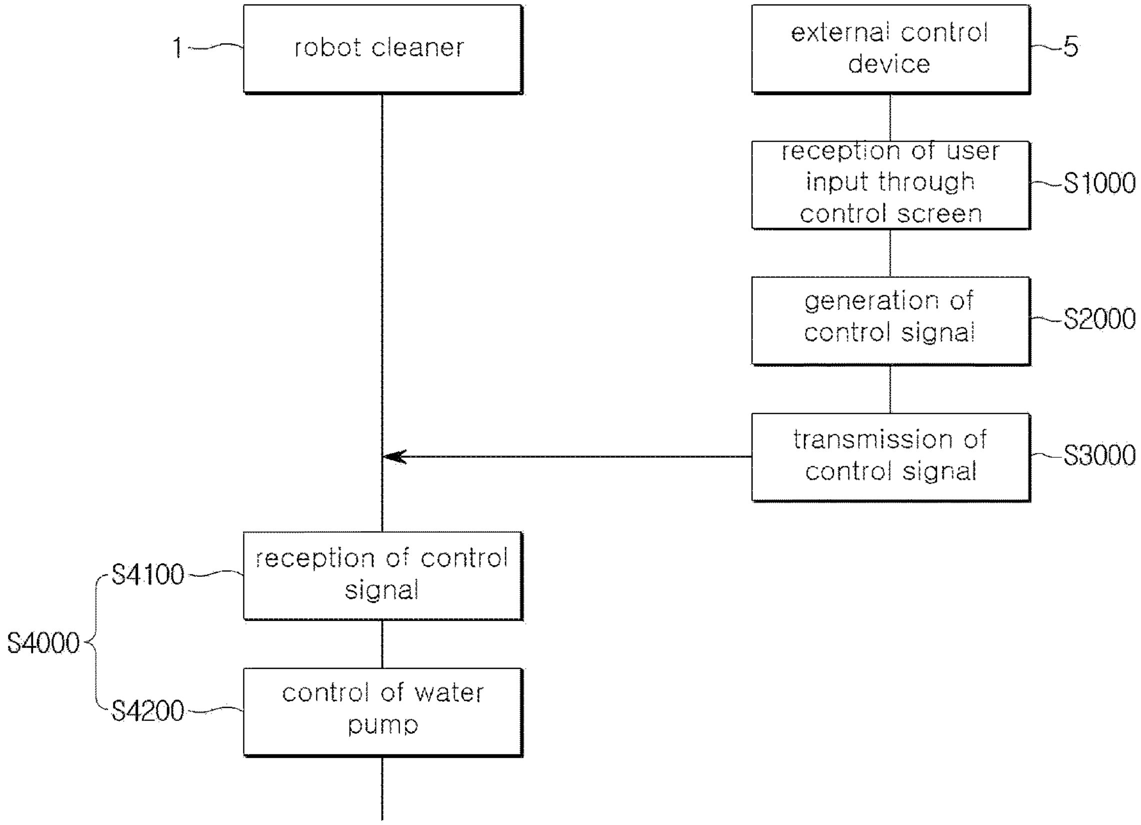

[FIG. 9]
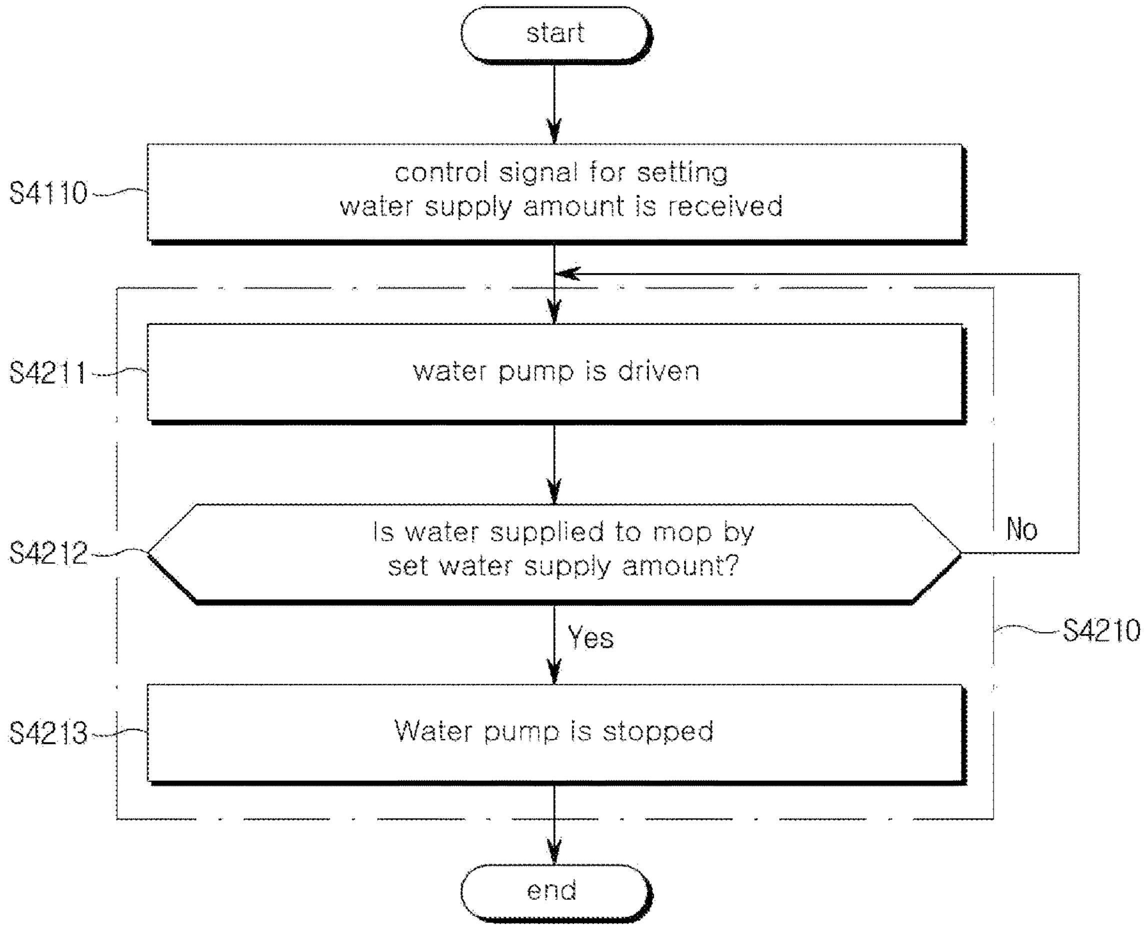

[FIG. 10]
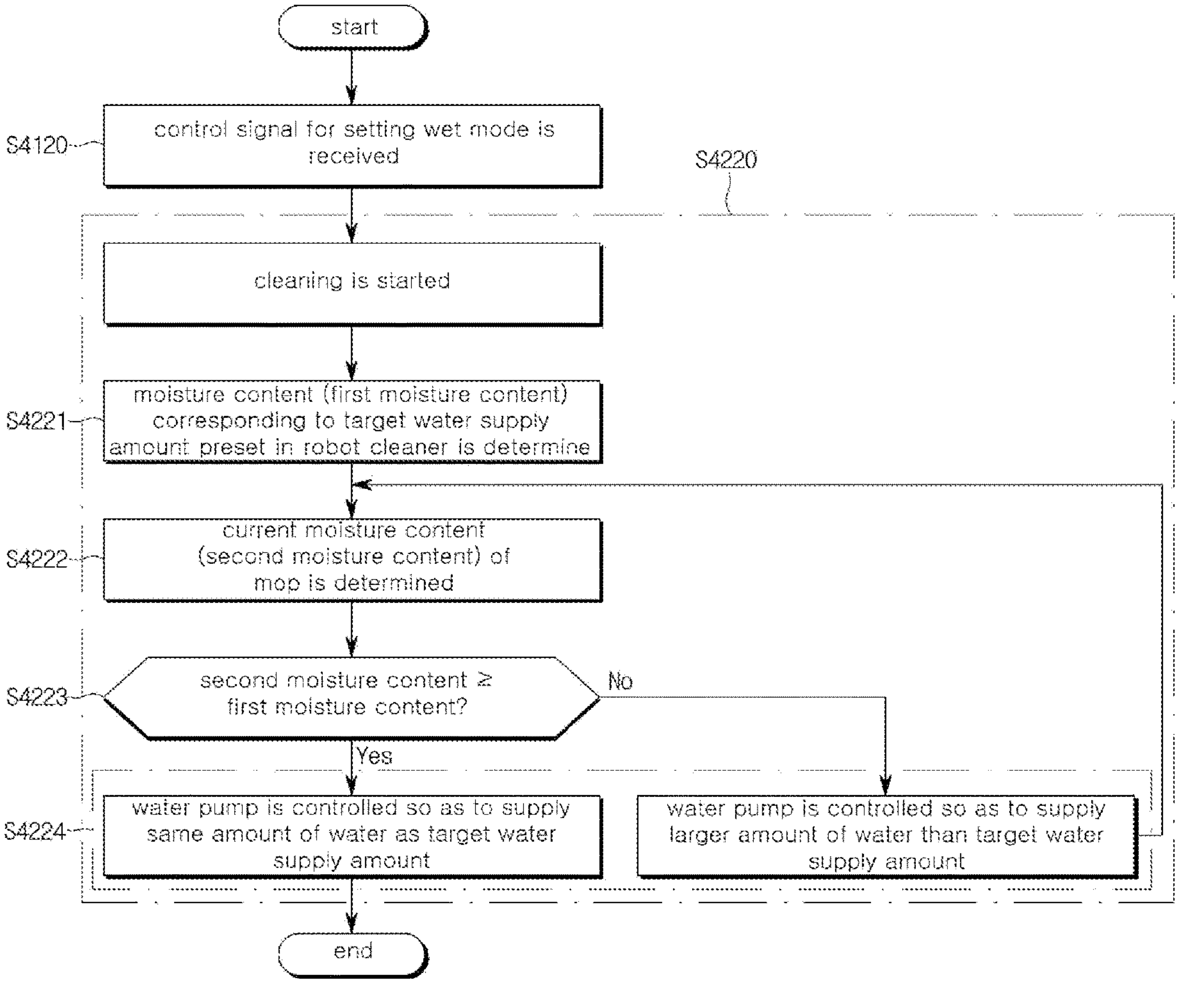

[FIG. 11]
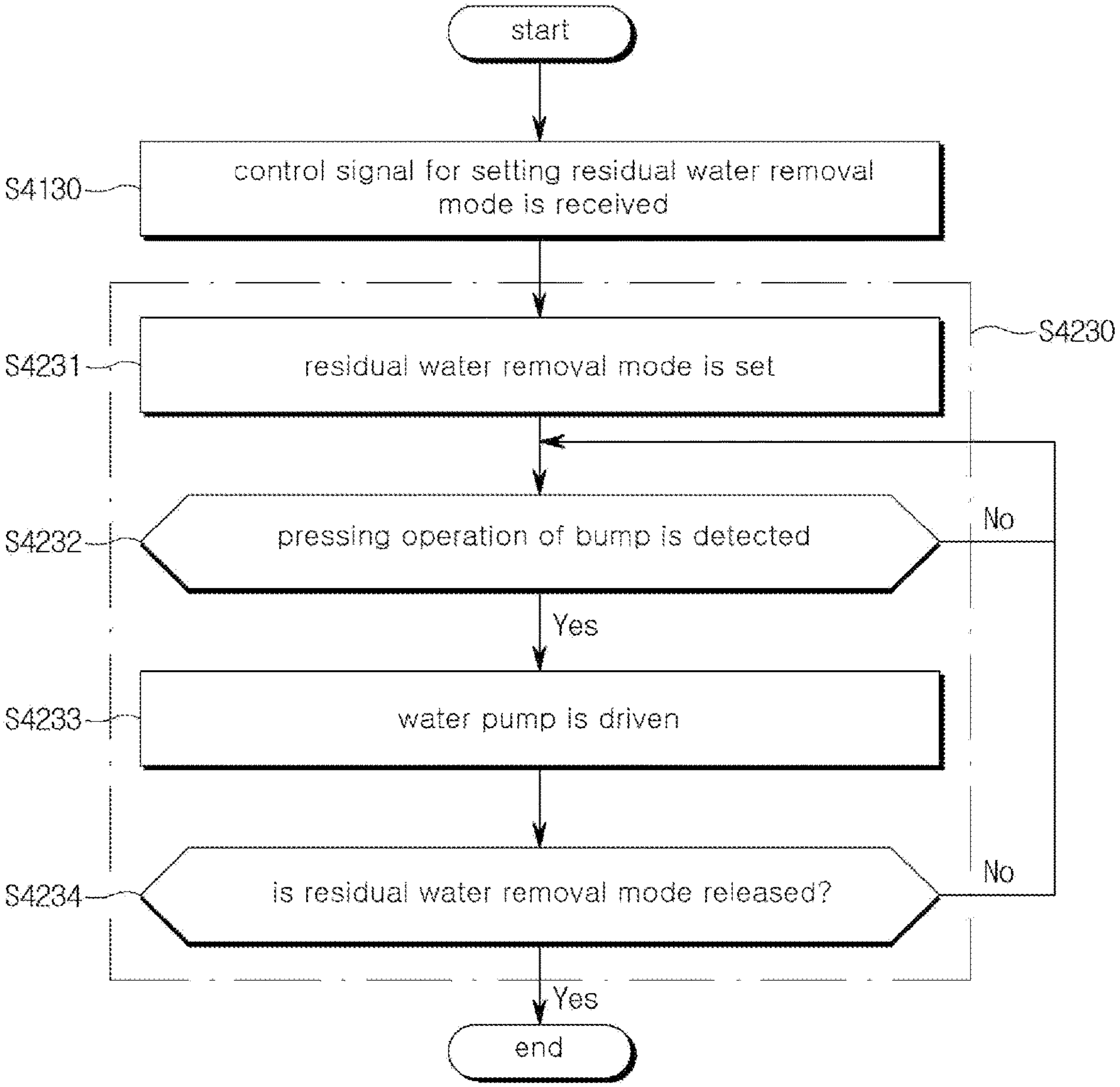

[FIG. 12]
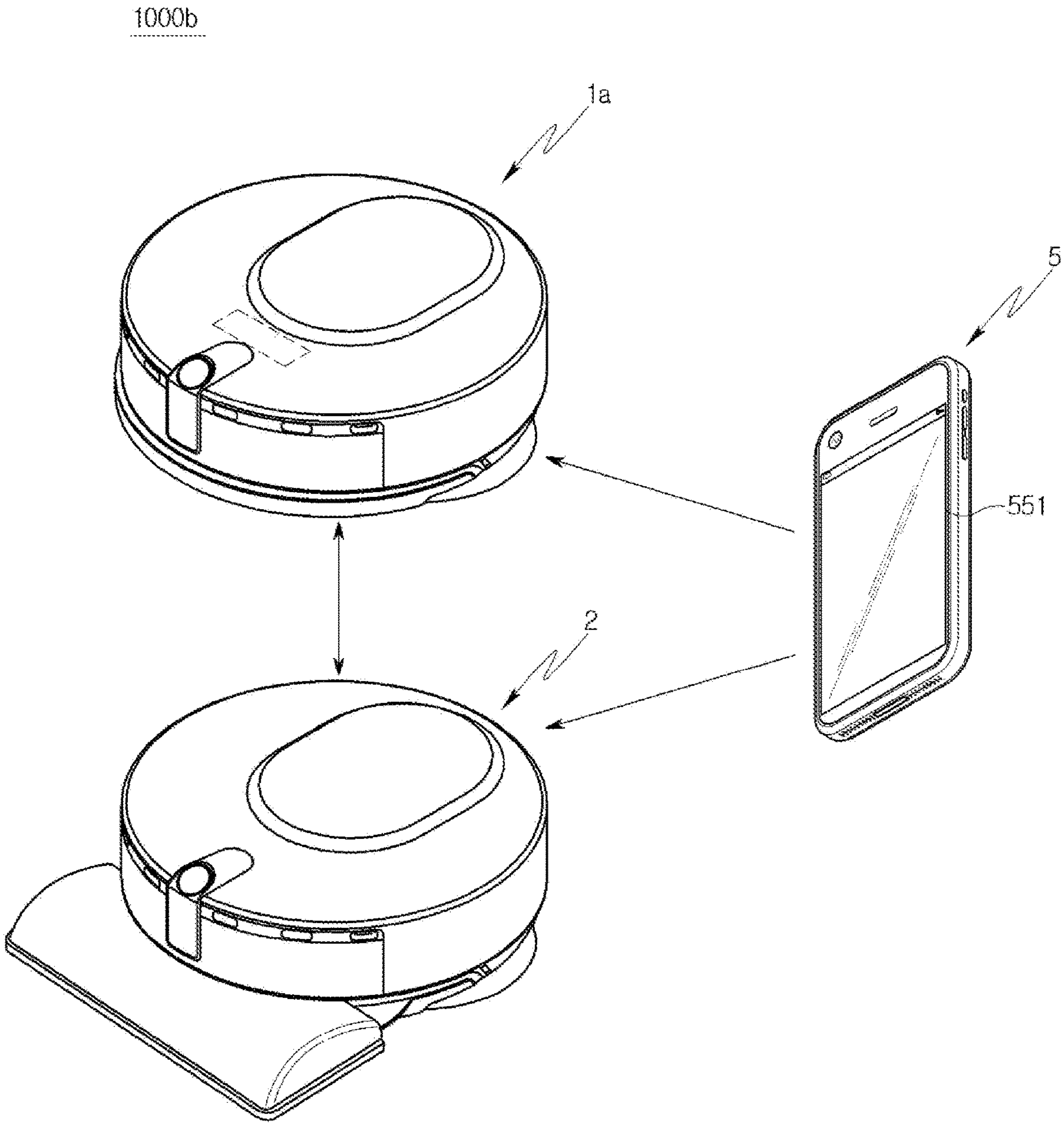

[FIG. 13]
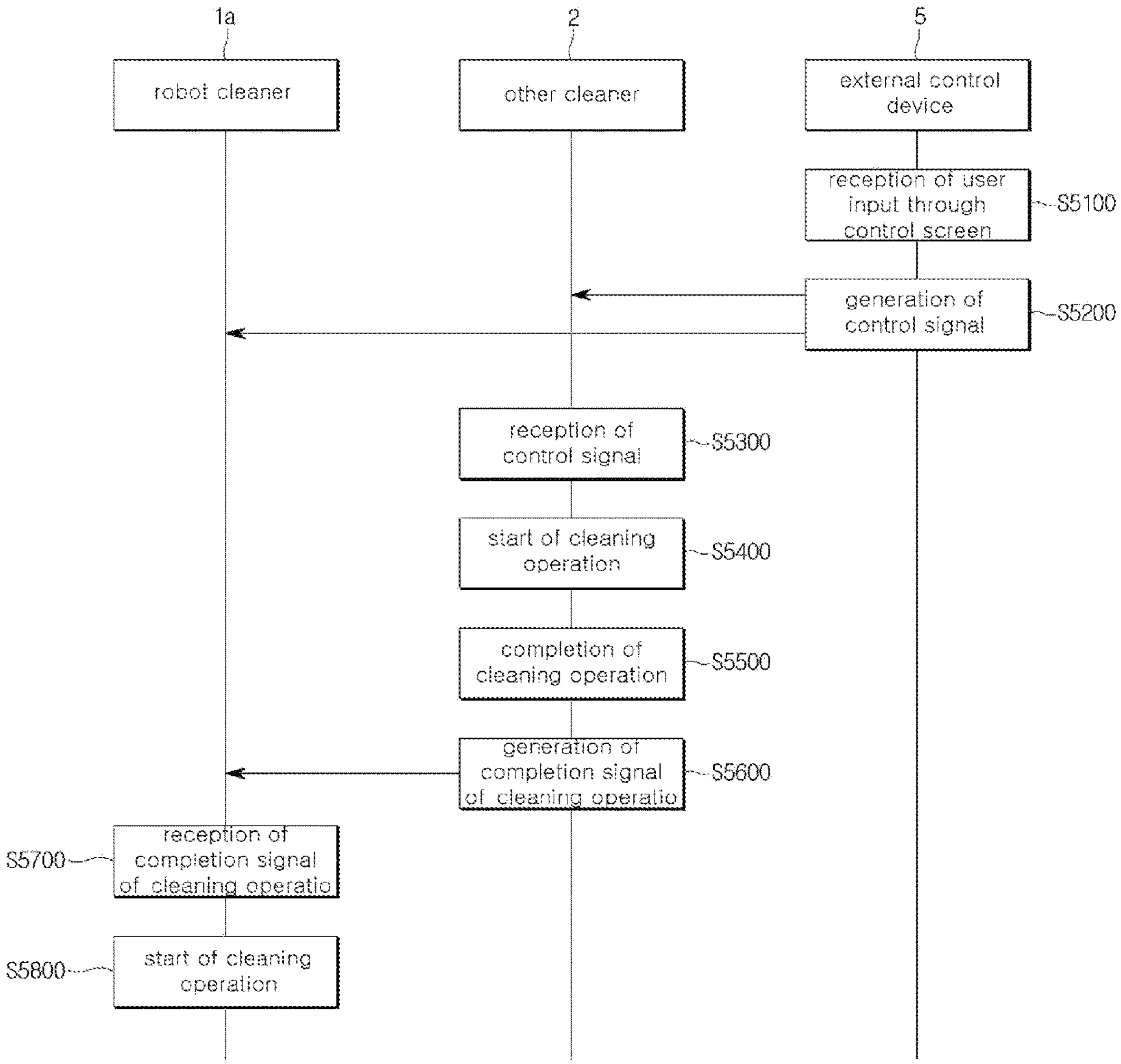

[FIG. 14a]
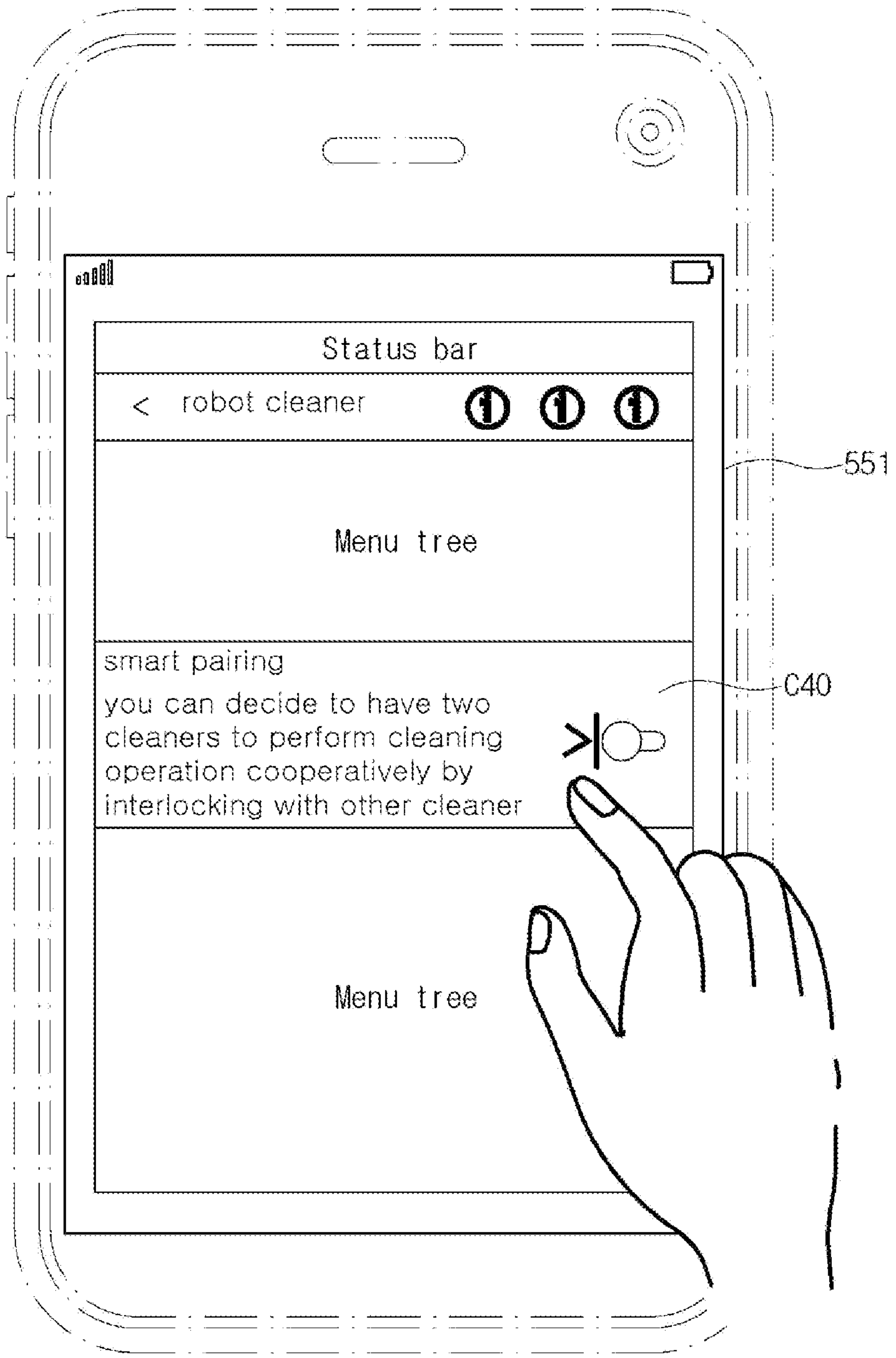

[FIG. 14b]
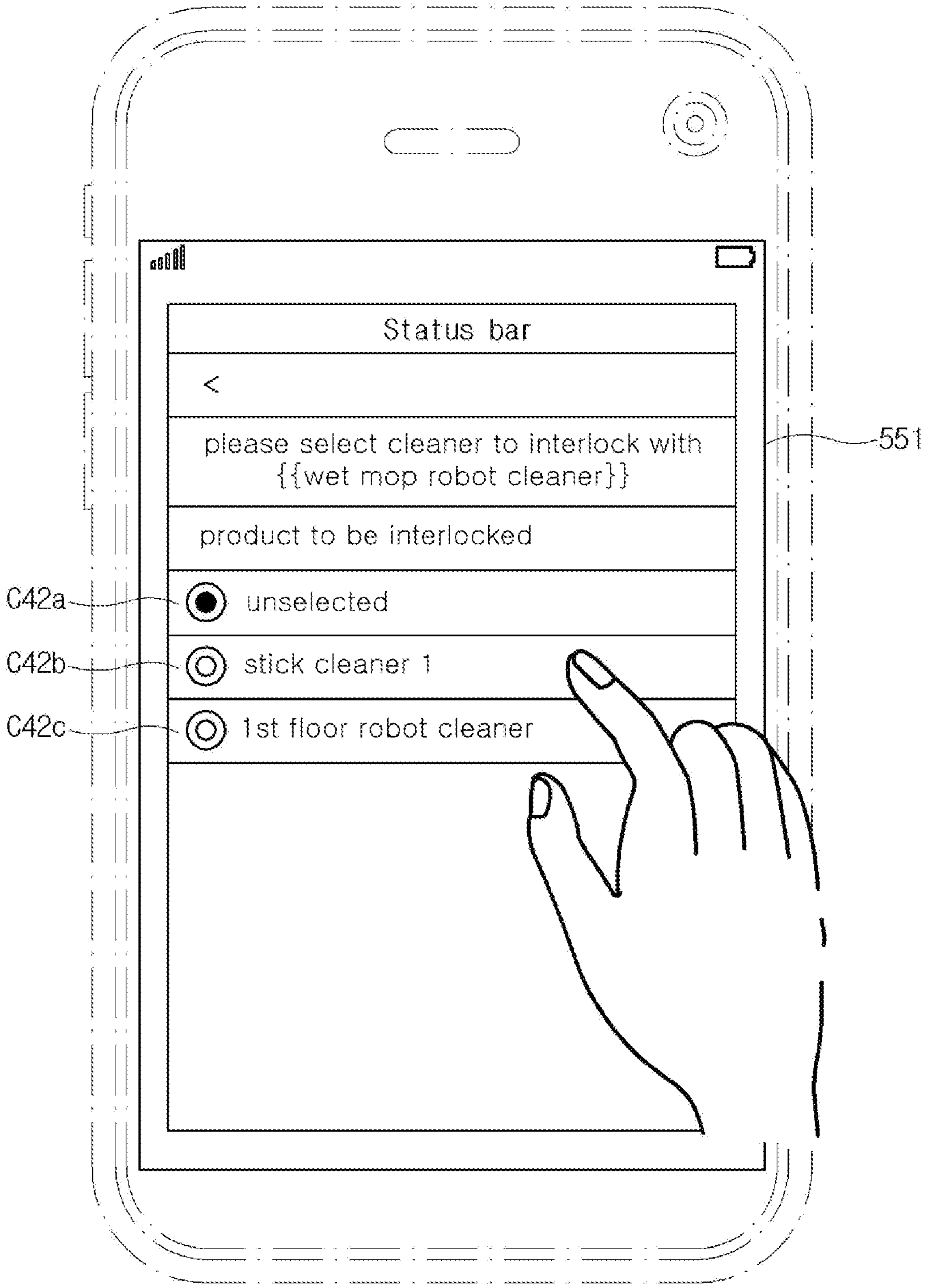

ROBOT CLEANER WITH GRAPHICAL USER INTERFACE FOR WATER SETTINGS

CROSS-REFERENCE TO RELATED APPLICATIONS

This application is the National Phase of PCT International Application No. PCT/KR2021/007672, filed on Jun. 18, 2021, which claims priority under 35 U.S.C. 119 (a) to Korean Patent Application No. 10-2020-0080837, filed in the Republic of Korea on Jul. 1, 2020, all of which are hereby expressly incorporated by reference into the present application.

TECHNICAL FIELD

The present invention relates to a robot cleaner capable of controlling a water pump of a robot cleaner by a user input through an external control device, a robot cleaning system having the same, and a control method of the robot cleaning system.

BACKGROUND ART

A robot cleaner is a household robot that autonomously drives on a surface to be cleaned with a certain area and removes dust or foreign substances around it, and according to its function, it is generally classified into a suction-type robot cleaner that sucks dust by vacuum, and a wet-type robot cleaner with a web mop function that wipes the surface to be cleaned using a mop.

On the other hand, the wet robot cleaner (hereinafter referred to as "robot cleaner") having the wet mop function has a water container, and it is configured to supply the water contained in the water container to the mop, and to wipe a floor surface with the moisture mop, thereby effectively removing foreign substance strongly attached to the floor surface.

These robot cleaners have different cleaning performance even with the same robot cleaner depending on the environment in which they are used. For example, if an amount of moisture supplied to a mop is insufficient when a floor surface is heavily contaminated, foreign substances cannot be effectively removed even after cleaning is completed. In addition, if the amount of moisture supplied to the mop is excessive when the floor surface is not heavily contaminated or when the floor surface is not absorbed by moisture, water marks may occur on the floor.

In addition, at the beginning of the cleaning operation of a robot cleaner, it is common that the mop attached to the robot cleaner is in a dry state or has a moisture content insufficient to perform wet mop cleaning. Therefore, the time taken from the start of the cleaning operation until the mop has a moisture content suitable for performing wet mop cleaning becomes longer, and the cleaning efficiency of the robot cleaner decreases due to improper mop cleaning at the beginning of the cleaning operation.

In addition, liquid may be remained in a robot cleaner even after cleaning is completed. If the cleaning operation is not performed for a long time with liquid remaining inside the robot cleaner and the robot cleaner is left unattended, the inside of the robot cleaner may become contaminated and cause odors.

Therefore, in order to solve the above problems, it is necessary to appropriately control a water pump for supplying water from the robot cleaner to the mop according to a situation.

In this regard, Korean Patent Registration No. 10-1613446 discloses a robot cleaner including a liquid management unit that stores liquid for wet cleaning and controls whether the stored liquid is discharged.

The liquid management unit disclosed in Korean Patent Registration No. 10-1613446 is configured to include a spherical control ball, and control whether the liquid is discharged or not by moving control ball so as to discharge the liquid when the robot cleaner drives, and by moving the control ball so as not to discharge the liquid when the robot cleaner does not drive.

Accordingly, there is a problem in that the liquid management unit of the robot cleaner disclosed in Korean Patent Registration No. 10-1613446 can only control whether the liquid is discharged or not, but cannot control the amount of liquid supplied depending on a situation.

In addition, Korean Patent Application Laid-Open No. 10-2019-0088691 relates to a cleaner configured to enable autonomous driving while mopping, and include a water supply module and a control unit for controlling the water supply module, wherein the control unit can control the pump to adjust an amount of water to be supplied.

However, even in Korean Patent Laid-Open No. 10-2019-0088691, there is a problem that a user cannot control the amount of water supplied according to a cleaning environment.

In addition, Korean Patent Laid-Open No. 10-2012-0042391 relates to a cleaning robot that performs a wet mop cleaning on a floor while moving by itself, and includes a water supply device. The water supply control of the water supply device is performed by controlling a control valve opening time interval and open time length or by controlling to spray a predetermined amount of water at a predetermined time interval so that a predetermined amount of water is supplied at a predetermined time interval according to a drying speed of the mop rubbing the floor.

However, since Korean Patent Laid-Open Patent No. 10-2012-0042391 controls the mop to continuously satisfy only a preset, predetermined moisture content, there is still a problem that a user cannot control the amount of water supplied differently according to a cleaning environment.

DOCUMENT OF RELATED ART

Patent Document (Patent Literature 1) Korean Patent Registration No. 10-1613446

(Patent Literature 2) Korean Patent Laid-Open Patent No. 10-2019-0088691

(Patent Literature 3) Korean Patent Laid-Open Patent No. 10-2012-0042391

DISCLOSURE

Technical Problem

An object of the present invention is to provide a robot cleaner capable of controlling an amount of water supplied to a mop of a robot cleaner according to a cleaning environment.

In addition, another object of the present invention is to provide a robot cleaner capable of quickly wetting a mop coupled to the robot cleaner at a beginning of a cleaning operation.

In addition, another object of the present invention is to provide a robot cleaner capable of effectively removing residual water inside the robot cleaner.

In addition, another object of the present invention is to provide a robot cleaning system and method thereof capable of remotely setting a water supply amount supplied to a mop of the robot cleaner.

In addition, another object of the present invention is to provide a robot cleaning system and method thereof capable of remotely setting a function of quickly wetting a mop coupled to the robot cleaner at a beginning of a cleaning operation.

In addition, another object of the present invention is to provide a robot cleaning system and method thereof capable of remotely setting a function of removing residual water inside the robot cleaner.

Technical Solution

In order to achieve the above object, the present invention provides a robot cleaner that autonomously cleans a surface to be cleaned while driving using one or more mops, including a body; a water container that is detachably coupled to one side of the body; and a water pump that is coupled to the water container and supplies water to the mop through a water supply tube. The water pump is controlled based on a control signal input by a user through an external control device.

Here, when the control signal input through the external control device is a control signal for setting a water supply amount, the water pump may be controlled so that a driving time of the water pump is controlled to supply the set water supply amount to the mop based on the control signal.

In addition, when the control signal input through the external control device is a control signal for setting a wet mode of the mop, the water pump may be controlled according to a comparison result of comparing a first moisture content corresponding to a target water supply amount preset to the robot cleaner and a second moisture content that is a current moisture content of the mop when cleaning operation of the robot cleaner starts.

In addition, when the second moisture content is less than the first moisture content, the water pump may be controlled to supply a larger amount of water than the target water supply amount to the mop, and when the second moisture content is equal to or greater than the first moisture content, the water pump may be controlled to supply the same amount of water as the target water supply amount to the mop.

In addition, the robot cleaner according to an embodiment of the present invention may further include a circular rotation plate that is coupled to a bottom surface of the body and connected to the mop; and a driving motor that is connected to the rotation plate to provide power to rotate the rotation plate. The second moisture content may be determined based on a current value flowing through the driving motor.

Meanwhile, the robot cleaner according to an embodiment of the present invention may further include a bumper that is coupled along an outline of the body at the other side opposite to one side of the body to which the water container is coupled; and a collision detection sensor that is coupled to the body, and detects a movement of the bumper with respect to the body. When the control signal input through the external control device is a control signal for setting a residual water removal mode for removing liquid remaining inside the robot cleaner, the water pump may be controlled to be driven whenever a pressing motion of the bumper is detected through the collision detection sensor.

Meanwhile, the robot cleaning system according to an embodiment of the present invention may include a robot cleaner that autonomously cleans a surface to be cleaned while driving using one or more mops, and includes a body, a water container coupled to the body, and a water pump coupled to the water container and supplying water to the mop through a water supply tube; and an external control device that includes a display unit for displaying a control screen and generates a control signal for controlling the water pump based on a user input inputted through the control screen to transmit the control signal to the robot cleaner.

Here, the external control device displays on the control screen a slider, which is a horizontal bar-shaped GUI object and movable by sliding a target point left and right by a user's touch input, a first color is displayed from a preset point of the slider to a point corresponding to a maximum water supply amount to be distinguished from a second color of other point of the slider, a water supply amount corresponding to a point where the target point stops on the slider is set as the water supply amount to be supplied to the robot cleaner.

In addition, the external control device may convert an entire slider to the first color and display a warning message below the slider when the target point slid by the touch input is located between the preset point and the point corresponding to the maximum water supply amount on the control screen.

In addition, the external control device may generate a control signal corresponding to information on the set water supply amount to transmit the control signal to the robot cleaner.

In addition, the external control device may display a mop wet item for setting a wet mode of the mop on the control screen, and generate a control signal for setting the wet mode to the robot cleaner to transmit the control signal to the robot cleaner when receiving the user input for selecting the mop wet item.

In addition, the external control device may display a residual water removal mode item for setting the residual water removal mode on the control screen, and generate a control signal for setting the residual water removal mode to the robot cleaner to transmit the control signal to the robot cleaner when receiving the user input for selecting the residual water removal mode item.

Meanwhile, the robot cleaning system according to another embodiment of the present invention further includes other cleaner to perform a cleaning operation in cooperation with the robot cleaner. When the external control device receives a user input for selecting the other cleaner on the control screen, the robot cleaner starts a cleaning operation by receiving a cleaning completion signal transmitted after the other cleaner completes cleaning.

Meanwhile, according to an embodiment of the present invention, the control method of a robot cleaning system, which includes a robot cleaner that autonomously cleans a surface to be cleaned while driving using one or more mops, and includes a body, a water container coupled to the body, and a water pump coupled to the water container and supplying water to the mop through a water supply tube, and an external control device that displays a control screen through a display unit, may include the steps of: receiving a user input through the control screen by the external control device; generating a control signal for controlling the water pump based on the user input by the external control device;

transmitting the control signal to the robot cleaner by the external control device; and receiving the control signal and controlling the water pump of the robot cleaner according to the control signal by the robot cleaner.

Here, the user input is a user input for setting a water supply amount, in the step of controlling the water pump of the robot cleaner, a driving time of the water pump may be controlled to supply the set water supply amount to the mop.

In addition, the user input is a user input for setting a wet mode of the mop, the step of controlling the water pump of the robot cleaner may include the steps of: determining a first moisture content corresponding to a target water supply amount preset in the robot cleaner; determining a second moisture content that is a current moisture content of the mop at the same time as a start of a cleaning operation; comparing the first moisture content with the second moisture content; and controlling the water pump according to a result of the comparison.

In addition, the robot cleaner may further include a bumper that is coupled along an outline of the body at the other side opposite to one side of the body to which the water container is coupled; and a collision detection sensor that is coupled to the body, and detects a movement of the bumper with respect to the body. The user input is a user input for setting a residual water removal mode for removing liquid remaining inside the robot cleaner, in the step of controlling the water pump of the robot cleaner, the water pump may be controlled so that the residual water inside the robot cleaner is removed through the water supply tube whenever a pressing operation of the bumper is detected through the collision detection sensor.

Advantageous Effect

The robot cleaner according to the present invention controls a water pump to supply the water supply amount set by a user to a mop, and thus, the water supply amount supplied to the mop of the robot cleaner can be differently controlled according to a cleaning environment, thereby increasing user convenience.

In addition, the robot cleaner according to the present invention controls a water pump by determining a water supply amount to be supplied to a mop based on a moisture content of the mop coupled to the robot cleaner when a wet mode is set in the robot cleaner, and thus, it is possible to quickly wet the mop at a beginning of the cleaning operation, and the cleaning efficiency is increased.

In addition, the robot cleaner according to the present invention can hygienically manage the robot cleaner by controlling a water pump to discharge the residual water inside the robot cleaner when a residual water removal mode is set in the robot cleaner.

On the other hand, the robot cleaning system and the method thereof according to the present invention include an external control device that displays a control screen for setting a water supply amount by receiving a user input, and thus, the user can conveniently and remotely control the robot cleaner according to a cleaning environment.

In addition, the robot cleaning system and the method thereof according to the present invention include an external control device that displays a control screen for setting a wet mode on the robot cleaner by receiving a user input, and thus, the user can remotely and conveniently set the wet mode.

In addition, the robot cleaning system and method thereof according to the present invention include an external control device that displays a control screen for setting a residual water removal mode on the robot cleaner by receiving a user input, and thus, the user can remotely and conveniently control the residual water removal mode.

DESCRIPTION OF DRAWINGS

FIG. 1 is a conceptual view of a robot cleaning system according to an embodiment of the present invention.

FIG. 2*a* is a perspective view illustrating a robot cleaner according to an embodiment of the present invention.

FIG. 2*b* is a view illustrating a partially separated configuration of a robot cleaner according to an embodiment of the present invention.

FIG. 2*c* is a rear view of a robot cleaner according to an embodiment of the present invention.

FIG. 2*d* is a bottom view of a robot cleaner according to an embodiment of the present invention.

FIG. 2*e* is an exploded perspective view of a robot cleaner according to an embodiment of the present invention.

FIG. 2*f* is an internal cross-sectional view of a robot cleaner according to an embodiment of the present invention.

FIG. 3 is a block diagram of a robot cleaner according to an embodiment of the present invention.

FIG. 4 is an internal block diagram of the external control device of FIG. 1.

FIGS. 5*a* and 5*b* are views illustrating a control screen of an external control device for setting a water supply amount to a robot cleaner.

FIG. 6 is a view showing a control screen of an external control device for setting a wet mode to a robot cleaner.

FIGS. 7*a* and 7*b* are views illustrating a control screen of an external control device for setting a residual water removal mode to a robot cleaner.

FIG. 8 is a flowchart illustrating a control method of a robot cleaning system according to an embodiment of the present invention.

FIG. 9 is a flowchart illustrating a control method for setting a water supply amount to a robot cleaner in a control method of a robot cleaning system according to an embodiment of the present invention.

FIG. 10 is a flowchart illustrating a control method for setting a wet mode to a robot cleaner in a control method of a robot cleaning system according to an embodiment of the present invention.

FIG. 11 is a flowchart illustrating a control method of setting a residual water removal mode to a robot cleaner in a control method of a robot cleaning system according to an embodiment of the present invention.

FIG. 12 is a conceptual diagram of a robot cleaning system according to another embodiment of the present invention.

FIG. 13 is a flowchart illustrating a method of performing a cooperative cleaning operation in conjunction with other cleaner in a control method of a robot cleaning system according to another embodiment of the present invention.

FIGS. 14*a* and 14*b* are views illustrating a control screen of an external control device for setting the cooperative cleaning operation in a robot cleaning system according to another embodiment of the present invention.

MODE FOR INVENTION

Hereinafter, preferred embodiments of the present invention will be described in detail with reference to the accompanying drawings.

Since the present invention can have various changes and can have various embodiments, specific embodiments are illustrated in the drawings and will be described in detail in the detailed description. This is not intended to limit the present invention to a specific embodiment, it should be construed to include all modifications, equivalents and substitutes included in the spirit and scope of the present invention.

In describing the present invention, terms such as first and second may be used to describe various components, but the components may not be limited by the terms. The above terms are only for the purpose of distinguishing one component from another. For example, without departing from the scope of the present invention, a first component may be referred to as a second component, and similarly, a second component may also be referred to as a first component.

The term "and/or" may include a combination of a plurality of related listed items or any of a plurality of related listed items.

When a component is referred to as being "connected" or "contacted" to another component, it may be directly connected or contacted to the other component, but it may be understood that other components may exist in between. On the other hand, when it is mentioned that a certain element is "directly connected" or "directly contacted" to another element, it may be understood that the other element does not exist in the middle.

The terms used in the present application are only used to describe specific embodiments, and are not intended to limit the present invention. The singular expression may include the plural expression unless the context clearly dictates otherwise.

In the present application, terms such as "comprise" or "have" are intended to designate that a feature, number, step, operation, component, part, or combination thereof described in the specification exists, and it may be understood that the presence or addition of one or more other features, numbers, steps, operations, components, parts, or combinations thereof is not precluded in advance.

Unless defined otherwise, all terms used herein, including technical or scientific terms, may have the same meaning as commonly understood by one of ordinary skill in the art to which this invention belongs. Terms such as those defined in a commonly used dictionary may be interpreted as having a meaning consistent with the meaning in the context of the related art, and unless explicitly defined in the present application, it may not be interpreted in an ideal or excessively formal meaning.

In addition, the following embodiments are provided to more completely explain to those with average knowledge in the art, and the shapes and sizes of elements in the drawings may be exaggerated for clearer explanation.

FIG. 1 is a conceptual view of a robot cleaning system according to an embodiment of the present invention.

Referring to FIG. 1, a robot cleaning system 1000*a* according to an embodiment of the present invention includes a robot cleaner 1 and an external control device 5 for remotely controlling the robot cleaner.

Here, the robot cleaner 1 autonomously drives and cleans a surface to be cleaned of an internal space in which the robot cleaner 1 itself is installed. The robot cleaner 1 is installed in the internal space of a house and configured to perform a cleaning operation that autonomously cleans a floor surface, which is a surface to be cleaned, according to a preset pattern or a command designated/input by a user while driving using one or more mops and to perform short-range wireless communication.

The robot cleaner 1 may be remotely controlled by the external control device 5.

In this case, the external control device 5 is a portable wireless communication electronic device. For example, the external control device 5 may be a mobile phone, a PDA, a laptop, a digital camera, a game machine, an e-book, and the like. In addition, the external control device 5 may support short-range communication corresponding to the short-range communication of the robot cleaner 1.

Hereinafter, the robot cleaner 1 will be described in detail with reference to the structural views shown in FIGS. 2*a* to 2*f* and the block diagram shown in FIG. 3.

FIGS. 2*a* to 2*f* are structural views for explaining the structure of the robot cleaner.

More specifically, FIG. 2*a* is a perspective view showing a robot cleaner, FIG. 2*b* is a view illustrating a partially separated configuration of the robot cleaner, FIG. 2*c* is a rear view of the robot cleaner, FIG. 2*d* is a bottom view of the robot cleaner, FIG. 2*e* is an exploded perspective view of the robot cleaner, and FIG. 2*f* is an internal cross-sectional view of the robot cleaner.

The robot cleaner 1 is placed on a floor and moved along a floor surface B to clean the floor. Accordingly, in the following description, a vertical direction is determined based on the state in which the robot cleaner 1 is placed on the floor.

And, based on a first rotation plate 10 and a second rotation plate 20, a side to which a first lower sensor 123, which will be described later, is coupled is set as a front (X-axis direction in FIG. 2*a*).

The 'lowest part' of each configuration described in the present invention may be the lowest-positioned part in each configuration when the robot cleaner 1 is placed on the floor for using, or may be a part closest to the floor.

The robot cleaner 1 may include a body 50, rotation plates 10, 20, mops 30, 40, a water container 141 and a water pump 143.

The body 50 may form the overall outer shape of the robot cleaner 1 or may be formed in the form of a frame. Each component constituting the robot cleaner 1 may be coupled to the body 50, and some components constituting the robot cleaner 1 may be accommodated in the body 50. The body 50 can be divided into a lower body 50*a* and an upper body 50*b*, and the components of the robot cleaner 1 can be provided in a space in which the lower body 50*a* and the upper body 50*b* are coupled to each other. (Refer to FIG. 2*e*).

The rotating plates 10, 20 are configured to be coupled to the bottom surface of the body 50 and connected to the mops 30, 40, to have a predetermined area, and to be formed in the form of a flat plate or a flat frame. The robot cleaner 1 may include one or more of these rotating plates 10, 20. For example, the robot cleaner 1 may be configured to include a first rotating plate 10 and a second rotating plate 20.

The first rotation plate 10 is made to have a predetermined area, and is formed in the form of a flat plate, a flat frame and the like. The first rotation plate 10 is generally laid horizontally, and thus, the width (or diameter) in the horizontal direction is sufficiently larger than the vertical height. The first rotation plate 10 coupled to the body 50 may be parallel to the floor surface B, or may form an inclination with the floor surface B. The first rotation plate 10 may be formed in a circular plate shape, the bottom surface of the first rotation plate 10 may be generally circular, and the first rotation plate 10 may be formed in a rotationally symmetrical shape as a whole.

The second rotation plate 20 is generally laid horizontally, and thus, the horizontal width (or diameter) is sufficiently larger than the vertical height. The second rotation plate 20 coupled to the body 50 may be parallel to the floor surface B, or may be inclined with the floor surface B. The second rotation plate 20 may be formed in a circular plate shape, the bottom surface of the second rotation plate 20 may be substantially circular, and the second rotation plate 20 may have a rotationally symmetrical shape as a whole.

In the robot cleaner 1, the second rotation plate 20 may be the same as the first rotation plate 10, or may be symmetrically formed. If the first rotation plate 10 is located on the left side of the robot cleaner 1, the second rotation plate 20 may be located on the right side of the robot cleaner 1, and in this case, the first rotation plate 10 and the second rotation plate 20 can be symmetrical left and right to each other.

The robot cleaner 1 may include one or more mops 30, 40. For example, the robot cleaner may be configured to include a first mop 30 and a second mop 40.

The first mop 30 has a bottom surface facing the floor to have a predetermined area, and the first mop 30 has a flat shape. The first mop 30 is formed in a form in which the width (or diameter) in the horizontal direction is sufficiently larger than the height in the vertical direction. When the first mop 30 is coupled to the body 50, the bottom surface of the first mop 30 may be parallel to the floor surface B, or may be inclined with the floor surface B.

The bottom surface of the first mop 30 may form a substantially circular shape, and the first mop 30 may be formed in a rotationally symmetrical shape as a whole. In addition, the first mop 30 may be detachably attached to the bottom surface of the first rotation plate 10, and may be coupled to the first rotation plate 10 to rotate together with the first rotation plate 10.

The second mop 40 has a bottom surface facing the floor to have a predetermined area, and the second mop 40 has a flat shape. The second mop 40 is formed in a form in which the width (or diameter) in the horizontal direction is sufficiently larger than the height in the vertical direction. When the second mop 40 is coupled to the body 50, the bottom surface of the second mop 40 may be parallel to the floor surface B, or may be inclined with the floor surface B.

The bottom surface of the second mop 40 may form a substantially circular shape, and the second mop 40 may have a rotationally symmetrical shape as a whole. In addition, the second mop 40 may be detachably attached to the bottom surface of the second rotation plate 20, and coupled to the second rotation plate 20 to rotate together with the second rotation plate 20.

When the first rotation plate 10 and the second rotation plate 20 rotate in opposite directions at the same speed, the robot cleaner 1 may move in a linear direction, and move forward or backward. For example, when viewed from above, when the first rotation plate 10 rotates counterclockwise and the second rotation plate 20 rotates clockwise, the robot cleaner 1 may move forward.

When only one of the first rotation plate 10 and the second rotation plate 20 rotates, the robot cleaner 1 may change direction and turn around.

When the rotation speed of the first rotation plate 10 and the rotation speed of the second rotation plate 20 are different from each other, or when the first rotation plate 10 and the second rotation plate 20 rotate in the same direction, the robot cleaner 1 can move while changing direction, and move in a curved direction.

The water container 141 is made in the form of a container having an internal space so that a liquid such as water is stored therein. The water container 141 may be fixedly coupled to the body 50, or detachably coupled to the body 50. More specifically, the water container 141 may be coupled to the rear surface of the body 50.

Referring to FIG. 2*e*, the water container 141 is coupled to the water supply tube 142 from one side toward the center of the body 50. The water supply tube 142 is formed in the form of a tube or pipe, and is connected to the water container 141 so that the liquid inside the water container 141 flows through the inside thereof.

The water supply tube 142 is configured such that the opposite end connected to the water container 141 is located on the upper side of the first rotation plate 10 and the second rotation plate 20, and accordingly, the liquid inside the water container 141 can be supplied to the first mop 30 and the second mop 40.

In the robot cleaner 1, the water supply tube 142 may be formed in a form in which one tube is branched into two, in this case, one branched end is located on the upper side of the first rotation plate 10, and the other branded end is located on the upper side of the second rotation plate 20.

The water pump 143 is connected to the water container 141 and is configured to move the liquid (water) through the water supply tube 142 to supply to the mops 30, 40.

Referring to FIG. 2*e*, the water pump 143 operates to spray water from the water container 141, in this case, the water injected from the water container 141 enters the water pump 143 through the water supply tube 142, and moves from the water pump 143 through the water supply tube 142 again. The water exiting the water pump 143 flows to one branched end of the water supply tube 142 and is supplied to the first mop 30 coupled to the first rotation plate 10 or flows to the other branched end of the water supply tube 142 and is supplied to the second mop 40 coupled to the second rotation plate 20.

Meanwhile, the water pump 143 may be controlled based on a control signal corresponding to a user input inputted by the user through the external control device 5.

The robot cleaner 1 may further include driving motors 56, 57.

The driving motors 56, 57 may be coupled to the body 50 to provide power to rotate the rotation plates 10, 20. The driving motors 56, 57 are provided as many as the number of the rotation plates 10, 20. For example, it may be configured with a first motor 56 connected to the first rotation plate 10 and a second motor 57 connected to the second rotation plate 20.

The first motor 56 and the second motor 57 may be an electric motor. In addition, a plurality of gears may be connected between the first motor 56 and the first rotation plate 10, and between the second motor 57 and the second rotation plate 20. The plurality of gears is configured to rotate while interlocking with each other, and transmits the rotational powers of the first motor 56 and the second motor 57 to the first rotation plate 10 and the second rotation plate 20, respectively. Accordingly, the first rotation plate 10 rotates when the rotating shaft of the first motor 56 rotates, and the second rotation plate 20 rotates when the rotating shaft of the second motor 57 rotates.

The robot cleaner 1 may further include a battery 135, a bumper 58, a collision detection sensor 121 and a distance sensor 122.

The battery 135 is configured to be coupled to the body 50 to supply power to other components constituting the robot cleaner 1. The battery 135 supplies power to the first motor 56, the second motor 57, and the water pump 143. The battery 135 may be charged by an external power source, and for this purpose, a charging terminal for charging the battery 135 may be provided on one side of the body 50 or the battery 135 itself. In the robot cleaner 1, the battery 135 may be coupled to the body 50.

The bumper 58 is coupled along the outline of the body 50, and may be coupled to the body 50 at the other side opposite to one side of the body 50 to which the water container 141 is coupled. That is, the bumper 58 may be coupled to the front surface of the body 50, and the water container 141 may be coupled to the rear surface of the body 50.

The bumper 58 is configured to move relative to the body 50. For example, the bumper 58 may be coupled to the body 50 so as to reciprocate along a direction approaching the center of the body 50. The bumper 58 may be coupled along a portion of the outline of the body 50, or may be coupled along the entire outline of the body 50.

The collision detection sensor 121 may be coupled to the body 50 and configured to detect a movement (relative movement) of the bumper 58 with respect to the body 50. The collision detection sensor 121 may be formed using a microswitch, a photo interrupter, a tact switch and the like.

The distance sensor 122 may be coupled to the body 50 and configured to detect a relative distance to an obstacle.

The robot cleaner 1 may further include a first lower sensor 123.

Referring to FIG. 2*d*, the first lower sensor 123 is formed on the lower side of the body 50, and is configured to detect a relative distance to the floor surface B. The first lower sensor 123 may be formed in various ways within a range capable of detecting the relative distance between the point where the first lower sensor 123 is formed and the floor surface B.

When the relative distance (which may be a distance in a vertical direction from the floor surface, or a distance in an inclined direction from the floor surface) to the floor surface B, detected by the first lower sensor 123 exceeds a predetermined value or a predetermined range, it may be the case in which the floor surface may be suddenly lowered, and accordingly, the first lower sensor 123 may detect a cliff.

The first lower sensor 123 may be formed of a photosensor, and may be configured to include a light emitting unit for irradiating light and a light receiving unit through which the reflected light is incident. The first lower sensor 123 may be an infrared sensor.

The first lower sensor 123 may be referred to as a cliff sensor.

The robot cleaner 1 may further include a second lower sensor 124 and a third lower sensor 125.

When a virtual line connecting the center of the first rotation plate 10 and the center of the second rotation plate 20 in a horizontal direction (a direction parallel to the floor surface B) is referred to as a connection line L1, the second lower sensor 124 and the third lower sensor 125 may be formed on the lower side of the body 50 on the same side as the first lower sensor 123 with respect to the connection line L1, and configured to sense the relative distance to the floor surface B (Refer to FIG. 2*d*).

The third lower sensor 125 may be formed opposite to the second lower sensor 124 based on the first lower sensor 123.

Each of the second lower sensor 124 and the third lower sensor 125 may be formed in various ways within a range capable of detecting a relative distance to the floor surface B. Each of the second lower sensor 124 and the third lower sensor 125 may be formed in the same manner as the above-described first lower sensor 123, except for a location where they are formed.

FIG. 3 is a block diagram of the robot cleaner according to an embodiment of the present invention.

Referring to FIG. 3, the robot cleaner 1 may include a control unit 110, a sensor unit 120, a power unit 130, a water supply unit 140, a driving unit 150, a communication unit 160, a display unit 170 and a memory 180.

The components shown in the block diagram of FIG. 3 are not essential for implementing the robot cleaner 1, so the robot cleaner 1 described in the present specification can have more or fewer components than those listed above.

First, the control unit 110 may be connected to the external control device 5 through wireless communication by a communication unit 160 to be described later. In this case, the control unit 110 may transmit various data about the robot cleaner 1 to the connected external control device 5. And, it is possible to receive data from the connected external control device 5 and store it. Here, the data transmitted from the external control device 5 may be a control signal for controlling at least one function of the robot cleaner 1.

In other words, the robot cleaner 1 may receive a control signal based on a user input from the external control device 5 and operate according to the received control signal.

In addition, the control unit 110 may control the overall operation of the robot cleaner 1. The control unit 110 controls the robot cleaner 1 to autonomously drive a surface to be cleaned and perform a cleaning operation according to the set information stored in the memory 180 to be described later.

When receiving a control signal for setting the water supply amount from the external control device 5, the control unit 110 may control the water pump 143 to supply the set water supply amount to the mop, based on the control signal.

In this case, the control signal for setting the water supply amount may be a control signal corresponding to information on the water supply amount set by the user input through the external control device 5.

More specifically, when the communication unit 160 receives the control signal for setting the water supply amount, the control unit 110 of the robot cleaner 1 may control the motor driving time of the water pump 143 in order to control the water supply amount supplied by the water pump 143 to the mops 30, 40. For example, as the motor driving time of the water pump 143 is increased, the water supply amount supplied to the mops 30, 40 increases, and as the motor driving time of the water pump 143 is shortened, the water supply amount supplied to the mops 30, 40 is decreased.

Table 1 below is an example showing the operation time of the water pump 143 according to the level of water supply amount.

TABLE 1

| level of water supply amount (Level) | Operation time (sec) of water pump |
|---|---|
| 1 | 1.7 |
| 2 | 2.1 |
| 3 | 2.6 |
| 4 | 3.0 |
| 5 | 3.4 |
| 6 | 3.8 |

As shown in Table 1, the control unit 110 may differently control the operation time of the water pump 143 according to the level of water supply amount, which is an index indicating the degree of the set water supply amount, and the data about the operation time of the water pump 143 may be prestored as a table in the memory 180 based on experimental data. For example, if the control signal received from the external control device 5 corresponds to level 3 of the water supply amount, the control unit 110 may receive the operation time of the water pump 143 corresponding to level 3 of the water supply amount from the memory 180 and control the motor of the water pump 143 to drive for 2.6 seconds and then stop.

In addition, the control unit 110 may determine the moving distance of the robot cleaner 1 and drive the water pump 143 whenever a predetermined distance is moved in order to prevent the water supplied to the mops 30, 40 from evaporating and drying while the robot cleaner 1 performs a cleaning operation.

For example, the predetermined distance may be 6 m, and the control unit 110 may drive the water pump 143 for a time corresponding to the water supply amount level of the set water supply amount whenever it is determined that the robot cleaner 1 has moved 6 m. In this case, the determination of the moving distance of the robot cleaner 1 may be determined using an optical flow sensor (OFS) and a gyro sensor.

However, the control of the water pump 143 according to the adjustment of the operation time is one according to an embodiment, and the method of controlling the water pump 143 is not limited thereto. For example, the adjustment of the water supply amount through the water pump 143 may be performed by a method of controlling the number of rotations of the motor of the water pump 143.

Meanwhile, the control unit 110 may receive a control signal for setting the wet mode of the mops 30, 40 from the external control device 5 through the communication unit 160.

When receiving the control signal for setting the wet mode, the control unit 110 may set the wet mode in the robot cleaner 1.

In this case, when the cleaning operation of the robot cleaner 1 is started in the state in which the wet mode is set, the control unit 110 may determine a first moisture content corresponding to the target water supply amount preset in the robot cleaner 1, determine a second moisture content, which is the current moisture content of the mops 30, 40, and control the water pump 143 according to a comparison result of comparing the first moisture content with the second moisture content.

Here, the target water supply amount may be the water supply amount set by the external control device 5 receiving a user input through a control screen. Alternatively, the target water supply amount may be a water supply amount stored as a default value in the memory 180 of the robot cleaner 1.

Here, the data on the first moisture content corresponding to the target water supply amount may be prestored as a table in the memory 180 or may be calculated from the control unit 110 through a predetermined arithmetic expression.

On the other hand, the second moisture content is the moisture content of the mops 30, 40 when the robot cleaner 1 starts the cleaning operation. The second moisture content may receive a current value flowing through the driving motors 56, 57 and be determined based on the current value.

More specifically, the driving motors 56, 57 are connected to the rotation plates 10, 20 and the mops 30, 40 are attached to the rotation plates 10, 20. When the rotation plates 10, 20 to which the mops 30, 40 are attached are rotated by the driving motors 56, 57 at the time of starting the cleaning operation, the load applied to the driving motors 56, 57 becomes different according to the moisture content of the mops 30, 40. The load applied to the driving motors 56, 57 is expressed as a current value, and as the load increases, the current value increases. Accordingly, the second moisture content may be determined by the current value flowing through the driving motors 56, 57, and data on the second moisture content corresponding to the current value may be prestored in the memory 180 as a table.

The control unit 110 compares the determined first moisture content with the second moisture content, and may control the water pump 143 to supply a larger amount of water than the target water supply amount to the mops 30, 40 when the second moisture content is less than the first moisture content.

That the second moisture content is less than the first moisture content means that the moisture content of the mops 30, 40 is insufficient to perform the cleaning operation, and thus, the control unit 110 may drive the water pump 143 for the operation time corresponding to a higher level than the level of the operation time of the water pump 143 corresponding to the water supply amount level of the target water supply amount.

For example, the control unit 110 may drive the water pump 143 for the operation time corresponding to a level higher by one level than the operation time of the water pump 143 corresponding to the water supply amount level of the target water supply amount.

More specifically, for example, when the second moisture content is smaller than the first moisture content and the water supply amount level of the target water supply amount is set to 3, the control unit 110 controls the water supply amount level of the water pump 143 to 4. Thus, the water pump 143 can be driven for 3.0 seconds.

In addition, when the second moisture content is equal to or greater than the first moisture content, the control unit 110 may control the water pump 143 to supply the same amount of water as the target water supply amount to the mops 30, 40.

That the second moisture content is equal to or greater than the first moisture content means that the moisture content of the rags 30, 40 is sufficient to perform the cleaning operation. Accordingly, the control unit 110 may drive the water pump 143 for the operating time of the water pump 143 corresponding to the water supply amount level of the target water supply amount.

Meanwhile, the control unit 110 may receive a control signal for setting a residual water removal mode for removing the liquid remaining inside the robot cleaner 1 from the external control device 5.

When receiving the control signal for setting the residual water removal mode through the communication unit 160, the control unit 110 may set the robot cleaner 1 to the residual water removal mode.

When the residual water removal mode is set, the control unit 110 of the robot cleaner 1 can control the water pump 143 so that the residual water inside the robot cleaner 1 can be discharged through the water supply tube 142 whenever a pressing operation is applied to the bumper 58.

More specifically, when the communication unit 160 receives the control signal for setting the residual water removal mode, the control unit 110 switches the state of the robot cleaner 1 to the residual water removal mode. In the residual water removal mode, the control unit 110 drives the water pump 143 whenever it detects the pressing operation of the bumper 58, that is, whenever the bumper 58 is pressed by an external force. In this case, the detection of the movement of the bumper 58 is performed by the collision detection sensor 121 of the robot cleaner 1.

In other words, in the residual water removal mode, whenever a user presses the bumper 58, the water pump 143 operates, and the residual water inside the robot cleaner 1 flows out to the bottom surface of the robot cleaner 1 through the water supply tube 142 and is removed.

On the other hand, the amount of water supplied to the mops 30, 40 may be automatically adjusted according to a preset condition. More specifically, the control unit 110 may control the water pump 143 to adjust the amount of water supplied to the mops 30, 40 according to a preset condition.

In a possible embodiment, the condition may be an area of a room to be cleaned.

The control unit 110 may control the water pump 143 so that the amount of water proportional to the area of the room is supplied to the mops 30, 40. That is, the control unit 110 may control the water pump 143 to supply a larger amount of water to the mops 30, 40 when the area of the room to be cleaned is large. To this end, the amount of water to be supplied to the mops 30, 40 per unit area may be prestored in the memory 180. Meanwhile, the control unit 110 may control the robot cleaner 1 to clean only the space selected by the user among the plurality of divided spaces to be cleaned. More specifically, the map information of the space to be cleaned generated by the robot cleaner 1 in a previous cleaning operation may be displayed as an image on the external control device 5. The space to be cleaned may include a plurality of areas, and such areas may be distinguishably displayed in the map information displayed as the image. The user may select one or more of the divided areas by a touch input, and the control unit 110 may control the robot cleaner 1 to clean only the selected area. In this case, the area of the room in which the cleaning is to be performed may mean the total area of the area selected by the user.

In a possible embodiment, the condition may be the amount of water remaining in the water container 141.

The control unit 110 controls the water pump 143 to adjust the amount of water to be supplied to the mops 30, 40 according to the amount of water remaining in the water container so as to prevent a situation in which all the water in the water container 141 is used and the water supply is stopped during the cleaning operation. That is, the control unit 110 controls the water pump 143 to supply a large amount of water to the mops 30, 40 when the amount of water remaining in the water container 141 is large, and the control unit 110 controls the water pump 143 to supply a small amount of water to the mops 30, 40 when the amount of water remaining in the water container 141 is small. To this end, a sensor for detecting the amount of water may be disposed in the water container 141. In addition, the amount of water to be supplied corresponding to the amount of water remaining in the water container 141 may be prestored in the memory 180.

In a possible embodiment, the condition may be a cleaning cycle.

The control unit 110 may control the water pump 143 so that the amount of water proportional to the time elapsed from the last time the cleaning operation is performed is supplied to the mops 30, 40. The degree of contamination of the space to be cleaned in a long cleaning cycle may be greater than that in a short cleaning cycle, so that a larger amount of water needs to be supplied to the mops 30, 40 when the cleaning with long cleaning cycle is performed. That is, the control unit 110 may control the water pump 143 to supply a larger amount of water to the mops 30, 40 when a large amount of time elapses from the time the last cleaning is performed and the cleaning cycle is lengthened. To this end, the amount of water to be supplied corresponding to the cleaning cycle may be prestored in the memory 180.

In a possible embodiment, the condition may be the degree of contamination of the area to be cleaned currently being cleaned.

The control unit 110 may control the water pump 143 so that an amount of water proportional to the degree of contamination of the area to be cleaned currently being cleaned is supplied to the mops 30, 40. The degree of contamination of the area to be cleaned may be different for each subarea. For example, an area to which foreign substances are attached among the areas to be cleaned may indicate a greater degree of contamination. When cleaning the area showing a greater degree of contamination, a larger amount of water needs to be supplied to the mops 30, 40 than when cleaning an area showing a small degree of contamination. That is, the control unit 110 may control the water pump 143 so that the amount of water supplied to the mops 30, 40 varies according to the degree of contamination of the area through which the robot cleaner 1 passes. In this case, the degree of contamination of the area to be cleaned may be measured in various ways. For example, the degree of contamination of the area to be cleaned may be measured using a value of a load applied to the driving motors 56, 57 that rotate the rotating plates 10, 20. The load applied to the driving motors 56, 57 is expressed as a current value, and as the load increases, the current value increases. When the degree of contamination of the floor surface in contact with the mops 30, 40 is large, the frictional force between the floor surface and the mops 30, 40 increases, resulting in a large load, and the amount of water supplied to the mops 30, 40 needs to be increased. To this end, the amount of water to be supplied corresponding to the value of the load applied to the driving motors 56, 57 may be prestored in the memory 180. Alternatively, for example, the degree of contamination of the area to be cleaned may be measured by analyzing an image taken from the front in the direction in which the robot cleaner 1 proceeds. To this end, the robot cleaner 1 may be provided with a camera for photographing the front of the moving direction.

One or more of the above conditions may be preset. When a plurality of conditions is preset, the amount of water supplied to the mops 30, 40 may be determined according to the priority set in the memory 180.

On the other hand, the control unit 110 may receive a control signal for setting an automatic water supply mode from the external control device 5 so that the robot cleaner 1 automatically controls the amount of water supplied to the mops 30, 40.

When receiving the control signal for setting the automatic water supply mode through the communication unit 160, the control unit 110 may set the automatic water supply mode in the robot cleaner 1.

When the automatic water supply mode is set, the amount of water supplied to the mops 30, 40 may be determined according to the preset conditions described above.

Meanwhile, the sensor unit 120 of the robot cleaner 1 may include one or more of the first lower sensor 123, the second lower sensor 124, the third lower sensor 125, the collision detection sensor 121 and the distance sensor 122. In addition, it may further include an OFS sensor and a gyro sensor.

In other words, the sensor unit 120 may include a plurality of different sensors capable of detecting the environment around the robot cleaner 1, and the information on the environment around the robot cleaner 1 detected by the sensor unit 120 may be transmitted to the control device 5 by the control unit 110. Here, the information on the environment may be, for example, whether an obstacle exists, whether a cliff is detected, whether a collision is detected, and the like.

The control unit 110 may be configured to control the operation of the motor 56 and/or the second motor 57 according to the information of the collision detection sensor 121. For example, when the bumper 58 comes into contact with an obstacle while the robot cleaner 1 is driving, the location where the bumper 58 comes into contact may be detected by the collision detection sensor 121, and the control unit 110 may control the operation of the first motor 56 and/or the second motor 57 to leave this contact location.

Meanwhile, in a state in which the robot cleaner 1 is set to a residual water removal mode, the control unit 110 may control only the driving of the water pump 143 without controlling the first motor 56 and/or the second motor 57 according to the information of the collision detection sensor 121.

In addition, according to the information of the distance sensor 122, when the distance between the robot cleaner 1 and the obstacle is less than or equal to a predetermined value, the control unit 110 may control the operation of the first motor 56 and/or the second motor 57 such that the driving direction of the robot cleaner 1 is changed, or the robot cleaner 1 moves away from the obstacle.

In addition, according to the distance detected by the first lower sensor 123, the second lower sensor 124 or the third lower sensor 125, the control unit 110 may control the operation of the first motor 56 and/or the second motor 57 such that the robot cleaner 1 stops or changes the driving direction.

Meanwhile, the power unit 130 receives external power and internal power under the control of the control unit 110 to supply power required for operation of each component. The power unit 130 may include the battery 135 of the robot cleaner 1 described above.

The water supply unit 140 may include the water container 141, the water supply tube 142, and the water pump 143 of the robot cleaner 1 described above. The water supply unit 140 can be controlled to adjust the water supply amount supplied to the first mop 30 and the second mop 40 during the cleaning operation of the robot cleaner 1 by the control unit 110. The control unit 110 may control a driving time of a motor that drives the water pump 143 to adjust the water supply amount.

Alternatively, when the pressing operation is applied to the bumper 58 in a state where the robot cleaner 1 is set to the residual water removal mode, the water supply unit 140 may be controlled to remove the water remaining inside the robot cleaner 1 by the control unit 110.

Alternatively, in a state where the robot cleaner 1 is set to the wet mode, the water supply unit 140 may be controlled to supply the first mop 30 and the second mop 40 with a water supply amount greater than a target water supply amount at the beginning of the cleaning operation by the control unit 110.

The driving unit 150 may include the above-described first motor 56 and the second motor 57 of the robot cleaner 1 and a plurality of gears. The driving unit 150 may be formed so that the robot cleaner 1 rotates or moves in a straight line according to a control command of the control unit 110.

Meanwhile, the communication unit 160 may include at least one module that enables wireless communication between the robot cleaner 1 and a wireless communication system, or between the robot cleaner 1 and a preset peripheral device, or between the robot cleaner 1 and a preset external server.

In this case, the preset peripheral device may be the external control device 5 of the robot cleaning system according to an embodiment of the present invention.

For example, the at least one module may include at least one of an IR (Infrared) module for infrared communication, an ultrasonic module for ultrasonic communication, or a short-range communication module such as a WiFi module or a Bluetooth module. Alternatively, it may be formed to transmit/receive data to/from a preset device through various wireless technologies such as wireless LAN (WLAN) and wireless-fidelity (Wi-Fi), including wireless internet module.

Meanwhile, the display unit 170 displays information to be provided to a user. For example, the display unit 170 may include a display for displaying a screen.

The display unit 170 may include a speaker for outputting a sound. The source of the sound output by the speaker may be sound data prestored in the robot cleaner 1. For example, the prestored sound data may be about a voice guidance corresponding to each function of the robot cleaner 1 or a warning sound for notifying an error.

In addition, the display unit 170 may be formed of any one of a light emitting diode (LED), a liquid crystal display (LCD), a plasma display panel, and an organic light emitting diode (OLED).

Lastly, the memory 180 may include various data for driving and operating the robot cleaner 1. The memory 180 may include an application program for autonomous driving of the robot cleaner 1 and various related data. In addition, each data sensed by the sensor unit 120 may be stored, and the setting information on various settings (for example, cleaning reservation time, cleaning mode, water supply amount, wet mode, residual water removal mode, etc.) selected or input by the user may be included.

Meanwhile, the memory 180 may include information on the surface to be cleaned currently given to the robot cleaner 1. For example, the information on the surface to be cleaned may be map information mapped by the robot cleaner 1 by itself. And the map information, that is, the map may include various information set by the user for each area constituting the surface to be cleaned.

In addition, the driving time of the water pump 143 corresponding to the water supply amount to be supplied by the water pump 143 to the mops 30, 40 may be stored in the memory 180 as data (Refer to Table 1).

FIG. 4 is an internal block diagram of the external control device of FIG. 1.

Referring to FIG. 4, the external control device 5 may include a server, a wireless communication unit 510 for exchanging data with other electronic devices such as the robot cleaner 1, and a control unit 580 that controls the screen of the application to be displayed on the display unit 551 according to a user input executing the application for controlling the robot cleaner 1.

In addition, the external control device 5 may further include an A/V (Audio/Video) input unit 520, a user input unit 530, a sensing unit 540, an output unit 550, a memory 560, an interface unit 570 and a power supply unit 590.

Meanwhile, the wireless communication unit 510 may receive location information and status information directly from the robot cleaner 1, or may receive location information and status information of the robot cleaner 1 through a server.

Meanwhile, the wireless communication unit 510 may include a broadcast reception module 511, a mobile communication module 513, a wireless internet module 515, a short-range communication module 517, a GPS module 519 and the like.

The broadcast reception module 511 may receive at least one of a broadcast signal and broadcast related information from an external broadcast management server through a broadcast channel. In this case, the broadcast channel may include a satellite channel, a terrestrial channel, and the like.

The broadcast signal and/or broadcast related information received through the broadcast reception module 511 may be stored in the memory 560.

The mobile communication module 513 transmits/receives wireless signals to and from at least one of a base station, an external terminal, and a server on a mobile communication network. Here, the wireless signal may include various types of data according to transmission/reception of a voice call signal, a video call signal, or text/multimedia message.

The wireless internet module 515 refers to a module for wireless internet access, and the wireless internet module 515 may be built-in or external to the external control device 5 for controlling the robot cleaner 1. For example, the wireless internet module 515 may perform WiFi-based wireless communication or WiFi Direct-based wireless communication.

The short-range communication module 517 is for short-range communication, and may support short-range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies.

The short-distance communication module 517 may support wireless communication between the external control device 5 for controlling the robot cleaner 1 through a short-range wireless communication network (Wireless Area Networks) and a wireless communication system, between the external control device 5 and an external control device of another robot cleaner, or between the external control device 5 and another mobile terminal, or between networks in which an external server is located. The short-range wireless communication network may be Wireless Personal Area Networks.

The Global Position System (GPS) module 519 may receive location information from a plurality of GPS satellites.

Meanwhile, the wireless communication unit 510 may exchange data with a server using one or more communication modules.

The wireless communication unit 510 may include an antenna 505 for wireless communication, and may include an antenna for receiving a broadcast signal in addition to an antenna for a call and the like.

The A/V (Audio/Video) input unit 520 is for inputting an audio signal or a video signal, and may include a camera 521, a microphone 523, and the like.

The user input unit 530 generates key input data input by a user to control the operation of the external control device 5. To this end, the user input unit 530 may include a key pad, a dome switch, a touch pad (static pressure/capacitive), and the like. In particular, when the touch pad forms a mutual layer structure with the display unit 551, it may be referred to as a touch screen.

The sensing unit 540 may generate a sensing signal for controlling the operation of the external control device 5 by detecting the current status of the external control device 5 such as the opening/closing status of the external control device 5, the location of the external control device 5, the presence or absence of user contact, and the like.

The sensing unit 540 may include a proximity sensor 541, a pressure sensor 543, a motion sensor 545, and the like. The motion sensor 545 may detect a motion or location of the external control device 5 using an acceleration sensor, a gyro sensor, a gravity sensor, and the like. In particular, the gyro sensor is a sensor for measuring angular velocity, and may detect a direction (angle) that is turned with respect to a reference direction.

The output unit 550 may include a display unit 551, a sound output module 553, a notification unit 555, a haptic module 557 and the like.

On the other hand, when the display unit 551 and the touch pad form a mutual layer structure and are configured as a touch screen, the display unit 551 may be used as an input device capable of inputting information by a user's touch in addition to an output device.

In this case, a screen for receiving an input from a user for a set value related to the control command for controlling the robot cleaner 1 may be displayed on the display unit 551, and the information processed by the external control device 5, such as another screen that is switched from the screen according to the user input and displayed, may be displayed and output.

That is, the display unit 551 may serve to receive information by a user's touch input, and at the same time, may also serve to display the information processed by the control unit 580, which will be described later.

A control screen for receiving the user input related to the control signal for controlling the robot cleaner 1 may be displayed on the display unit 551. Here, information on the state of the robot cleaner 1 received through the wireless communication unit 510 may be displayed on the control screen.

The sound output module 553 outputs audio data received from the wireless communication unit 510 or stored in the memory 560. The sound output module 553 may include a speaker, a buzzer, and the like.

The notification unit 555 may output a signal for notifying the occurrence of an event in the external control device 5. For example, the signal may be output in a form of vibration.

The haptic module 557 generates various tactile effects that a user can feel. A representative example of the tactile effect generated by the haptic module 557 is a vibration effect.

The memory 560 may store a program for processing and control of the control unit 580, and perform a function for temporary storage of input or output data (for example, phonebook, message, still image, video, etc.).

The interface unit 570 functions as an interface with all external devices connected to the external control device 5. The interface unit 570 may receive data or power from such an external device and transmit it to each component inside the external control device 5, and allow the data inside the external control device 5 to be transmitted to an external device (for example, the robot cleaner 1).

The control unit 580 controls the overall operation of the external control device 5 by generally controlling the operations of the respective units. For example, it may perform related control and processing for voice calls, data communications, video calls, and the like. In addition, the control unit 580 may include a multimedia playback module 581 for playing multimedia. The multimedia playback module 581 may be configured as a hardware in the control unit 580 or may be configured as a software separately from the control unit 580.

In addition, the control unit 580 may display a control screen for controlling the robot cleaner 1 on the display unit 551, switch the control screen to another control screen according to a user's touch input, and transmit to the robot cleaner 1 the control signal for controlling the robot cleaner 1 based on the user input inputted through the display unit 551.

FIGS. 5*a* and 5*b* are views showing a control screen of an external control device for setting a water supply amount to a robot cleaner.

Referring to FIG. 5*a*, the control unit 580 of the external control device 5 may display on a control screen a slider C10 which is a horizontal bar-shaped GUI object that can be moved by sliding a target point C11 left and right by a user's touch input.

Here, grid lines are displayed on the slider C10, and an image object C13 may be displayed at a predetermined interval on the lower portion of the slider C10. In this case, the image object C13 may be in the form of a water droplet as shown in FIGS. 5*a* and 5*b*. Also, the water droplet-shaped image object C13 may be formed so that the inside of the image object C13 is filled with a shadow according to a water supply amount to be set.

Accordingly, a user can intuitively grasp the degree of set water supply amount.

For example, the image object C13 filled with 0% shading corresponds to a "dry mop" mode, which is a mode in which the water supply amount is 0. As the target point C11 on the slider C13 moves from left to right, the shadow of the image object C13 is gradually filled in, and the water supply amount mode is changed to correspond from "low wet mop" mode to "high wet mop" mode.

In addition, a water supply amount mode area C14 in which the set water supply amount mode is guided in text may be displayed on the upper side of the slider C10. For example, at the same time as the target point C11 moves on the slider C10, the text of the water supply amount mode area C14 may be changed to "dry mop", "low wet mop" or "high wet mop" in real time and displayed.

Also, the control unit 580 may display a first area C12*a*, which is from a preset point on the slider C10 to a right end point of the slider C10 corresponding to the maximum water supply amount, in a first color. In this case, the preset point may be a point corresponding to the water supply amount of the "high wet mop" mode.

In addition, the control unit 110 displays a second region C12*b*, which is another point on the slider C10 other than the point indicated by the first color, in a second color so that it can be distinguished from the point indicated by the first color.

Accordingly, the user can intuitively grasp an appropriate range of the water supply amount to be supplied to the mops 30, 40.

On the other hand, the target point C11 may be slid left and right on the slider C10 by a user's touch input, and the water supply amount corresponding to the point where the target point C11 stops on the slider C10 may be set to the water supply amount to be supplied to the robot cleaner 1.

For example, referring to FIG. 5*a* and Table 1 above, the control unit 580 may set the water supply amount to be corresponded to level 1 of the water supply amount when the target point C11 of the slider C10 stops at a first scale line of the slider C10, set the water supply amount to be corresponded to level 2 of the water supply amount when the target point C11 stops at a second grid line, and set the water supply amount to be corresponded to level 6 of the water supply amount when the target point C11 stops at the last grid line.

In this case, the user's touch input for moving the position of the target point C11 is performed by touching down the target point C11 and then dragging it to a desired position, or by tapping directly at the desired position and positioning the target point C11.

Also, the control unit 580 may display a third color from the left end of the slider C10 to the target point C11 set by the user's touch input.

Accordingly, the user can intuitively grasp the degree of the water supply amount set by the user.

Referring to FIG. 5*b*, when the target point C11 slid by the user is located in a first zone C12*a*, which is between a preset point and a point corresponding to the maximum water supply amount, that is, when the target point C11 is located at a point marked with the first color, the control unit 580 can convert the entire color of the slider C10 to the first color, and display a warning message below the slider C10. For example, the warning message may be "Please be careful for excessively wet mop."

Accordingly, when the set water supply amount is excessive, there is an effect of calling attention to a user through the warning message, and it is possible to prevent in advance the phenomenon that the mops 30, 40 coupled to the robot cleaner 1 are excessively wet and water flows to the floor surface, which is the surface to be cleaned.

Meanwhile, as described above, the control unit 580 may receive a user input and generate a control signal corresponding to the information on the set water supply amount based on the information on the set water supply amount, and the control signal may be transmitted to the robot cleaner 1 through the wireless communication unit 510 of the external control device 5. Here, the information on the set water supply amount may be information on the above-described water supply amount level.

FIG. 6 is a view showing a control screen of an external control device for setting a wet mode in the robot cleaner.

Referring to FIG. 6, the control unit 580 of the external control device 5 may display on the control screen a mop wet item C20 for receiving a user input for switching the robot cleaner 1 into a wet mode.

Here, the mop wet item C20 may be displayed on the control screen for reserving the cleaning operation of the robot cleaner 1. On the control screen for reserving the cleaning operation, items for selecting a reservation time, a reserved day of the week, and an area to be cleaned may be displayed together with the mop wet item C20.

Further, the mop wet item C20 may include guiding text for the wet mode and a button C21 configured to activate or deactivate the wet mode.

Here, the guiding text for the wet mode is composed of phrases that a user can intuitively understand about the wet mode, for example, "quickly wet dry mop when starting cleaning" as shown in FIG. 6.

When receiving the user's input for selecting the button C21 included in the mop wet item C20, the control unit 580 may generates a control signal for setting the wet mode in the robot cleaner 1, and transmit the control signal to the robot cleaner 1 through a wireless communication unit 510.

FIGS. 7*a* and 7*b* are views illustrating a control screen of an external control device for setting a residual water removal mode in the robot cleaner.

Referring to FIG. 7*a*, the control unit 580 may display a residual water removal start screen on the display 551 as a control screen for removing the liquid inside the robot cleaner 1.

The control unit 580 may display a residual water removal mode item C30 for receiving a user input for switching the robot cleaner 1 into a residual water removal mode on the residual water removal screen. In this case, the residual water removal mode item C30 may be a residual water removal start button C30.

Also, the control unit 580 may display an image area C31 and an explanation area C32 for explaining a method of removing residual water of the robot cleaner 1 on the residual water removal screen.

A guide message guiding a method of removing residual water may be displayed in the explanation area C32 so that the user can easily remove residual water. In addition, in the explanation area C32, a warning message to warn that water may splash while the residual water of the robot cleaner 1 is discharged, and at the same time, to call the user's attention to execute the residual water removal mode at a suitable place to remove the residual water may be displayed.

In addition, an image showing a residual water removal method may be displayed on the image area C32, in order to guide the use while assisting the guide message on the explanation area C31.

According to the guide message and warning message of the explanation area C32 and the image of the image area C31, the user may be guided to move to a suitable place to remove residual water, and may be guided to take a correct posture for removing residual water. Therefore, the user's convenience is improved through this.

The control unit 580 may generate a control signal for setting the residual water removal mode in the robot cleaner 1 when receiving the user input for selecting the residual water removal mode item C30, and transmit the control signal to the robot cleaner 1 through the wireless communication unit 510.

When the user selects the residual water removal end button C33 on the residual water removal end screen, the control unit 580 may generate a control signal for releasing the robot cleaner 1 from the residual water removal mode, and transmit the control signal to the robot cleaner 1 through the wireless communication unit 510.

On the other hand, referring again to FIG. 4, the power supply unit 590 of the external control device 5 may receive external power and internal power under the control of the control unit 580 to supply power required for the operation of each component.

Meanwhile, the block diagram of the external control device 5 shown in FIG. 4 is a block diagram for an embodiment of the present invention. Each component in the block diagram may be integrated, added, or omitted according to the specifications of the actually implemented external control device 5.

That is, two or more components may be combined into one component, or one component may be subdivided into two or more components as needed. In addition, the function performed by each block is for explaining the embodiment of the present invention, and the specific operation or device does not limit the scope of the present invention.

FIG. 8 is a flowchart illustrating a control method of a robot cleaning system according to an embodiment of the present invention.

Referring to FIG. 8, the control method of the robot cleaning system 1000*a* according to an embodiment of the present invention includes the steps of: receiving a user input through a control screen by the external control device 5 (S1000); generating a control signal for controlling the water pump 143 based on the user input by the external control device 5 (S2000); transmitting the control signal to the robot cleaner 1 by the external control device 5 (S3000); and receiving the control signal by the robot cleaner 1 and controlling the water pump 143 of the robot cleaner 1 according to the control signal by the robot cleaner 1 (S4000).

Hereinafter, various embodiments of the process S4000 according to the type of user input in the control method of the robot cleaning system according to an embodiment of the present invention will be described.

FIG. 9 is a flowchart illustrating a control method for setting a water supply amount to a robot cleaner in a control method of a robot cleaning system according to an embodiment of the present invention.

Referring to FIG. 9, first, the communication unit 160 of the robot cleaner 1 receives a control signal for setting the water supply amount from the external control device 5 (S4110).

Here, the control signal for setting the water supply amount is a control signal corresponding to information on the water supply amount set by the user through the external control device 5 as described above.

The control unit 110 receives the control signal (S4110), operates the water pump 143 (S4211), determines whether water is supplied to the mops 30, 40 by the set water supply amount (S4212), and stops the water pump 143 (S4213) or continue to operate. Block (S4210) includes steps (S4211), (S4212) and (S4213), which involves a process of operating the water pump.

In this case, the determination of whether water is supplied to the mops 30, 40 by the set water supply amount can be determined based on whether the water pump 143 operates for the operation time of the water pump 143 corresponding to the water supply amount level of the set water supply amount. (Refer to Table 1 above)

If water is not supplied to the mops 30, 40 by the set water supply amount, that is, if it does not take as much time as the operation time of the water pump 143 corresponding to the water supply amount level of the set water supply amount, the process returns to step S4211 and continues operating the water pump 143.

On the other hand, if water is supplied to the mops 30, 40 by the set water supply amount, that is, if the operation time of the water pump 143 corresponding to the water supply amount level of the set water supply amount has elapsed, the water pump 143 is stopped and it is controlled so that water is not supplied to the mops 30, 40.

In addition, the control unit 110 may determine the moving distance of the robot cleaner 1 until the robot cleaner 1 starts the cleaning operation, ends the cleaning operation, and returns to the charging station, and drive the water pump 143 for the operating time corresponding to the water supply amount level of the set water supply amount whenever a preset predetermined moving distance is accumulated.

Through this, it is possible to prevent the mops 30, 40 from drying out in the middle of the cleaning operation. Meanwhile, for example, the preset predetermined moving distance may be 6 m.

Meanwhile, the operation time of the water pump 143 corresponding to the water supply amount level and the preset predetermined moving distance may be stored in the memory 180 of the robot cleaner 1.

In this way, since the robot cleaner 1 can control the water pump 143 according to a user input, the user can select a small water supply amount, for example, when a floor surface is made of a material that does not absorb water or when the contamination level of the floor surface is not severe. Alternatively, the user can select a large water supply amount, for example, when the floor surface is made of a material that absorbs water well or when the contamination level of the floor surface is severe.

In this way, since the water supply amount can be set according to the environment of the space to be cleaned, the user's satisfaction with the cleaning effect can be increased.

FIG. 10 is a flowchart illustrating a control method for setting a wet mode to a robot cleaner in a control method of a robot cleaning system according to an embodiment of the present invention.

The communication unit 160 of the robot cleaner 1 receives a control signal for setting the wet mode from the external control device 5 (S4120). In this case, the wet mode may or may not be set for each reserved cleaning.

When the cleaning operation of the reserved cleaning in which the wet mode is set starts, the control unit 110 of the robot cleaner determines a first moisture content corresponding to the target water supply amount preset in the robot cleaner 1 (S4221), and determines the second moisture content, which is the moisture content of the mops 30, 40 at the current time when the cleaning operation starts (S4222).

Thereafter, the control unit 110 compares the first moisture content with the second moisture content (S4223) and controls the water pump according to the comparison result (S4224).

In this case, when the second moisture content is greater than or equal to the first moisture content, the control unit 110 may control the water pump 143 to supply the same amount of water as the target water supply amount to the mops 30, 40. The control unit 110 may operate the water pump 143 for as long as the operation time of the water pump 143 corresponding to the water supply amount level of the target water supply amount.

In addition, when the second moisture content is smaller than the first moisture content, the control unit 110 may control the water pump 143 to supply a larger amount of water than the target water supply amount to the mops 30, 40. For example, when the water supply amount level of the target water supply quantity is 3, the control unit 110 may drive the operation time of the water pump 143 by 3.0 seconds, which is the operation time corresponding to the water supply quantity level 4.

Then, returning to step S4222, the control unit 110 determines the second moisture content again and compares it with the first moisture content. The comparison of the second moisture content with the first moisture content is repeated until the second moisture content becomes equal to or greater than the first moisture content.

In other words, when the second moisture content is smaller than the first moisture content, the control unit 110 controls the water pump 143 to supply a larger amount of water than the target water supply amount to the mops 30, 40, but when the second moisture content becomes equal to or greater than the first moisture content, the control unit 110 controls the water pump 143 to supply the target water supply amount to the mops 30, 40. In this way, the amount of water supplied to the mops 30, 40 at the beginning of the cleaning operation is concentrated so that the mops 30, 40 can be quickly wetted.

Through this, it is possible to reduce the time for cleaning the mops 30, 40 in a dry state at the beginning, and it is possible to further increase the wet mop cleaning efficiency of the robot cleaner 1.

FIG. 11 is a flowchart illustrating a control method of setting a residual water removal mode in a robot cleaner in a control method of a robot cleaning system according to an embodiment of the present invention.

When the communication unit 160 of the robot cleaner receives a control signal for setting the residual water removal mode from the external control device 5 (S4130), the control unit 110 sets the robot cleaner 1 to the residual water removal mode (S4231). In this case, the robot cleaner 1 is converted to a standby state for removing residual water.

Thereafter, the control unit 110 may determine whether a pressing operation of the bumper 58 is detected (S4232), and drive the water pump 143 so that the water inside the robot cleaner 1 flows through the water supply tube 142 when the pressing operation of the bumper 58 is detected (S4233). Block (S4230) includes steps (S4231)-(S4334) and represents a control method of setting a residual water removal mode in the robot cleaner.

Here, the detection of pressing operation of the bumper 58 is performed by the collision detection sensor 121. That is, whenever the user lifts the robot cleaner 1 and presses the bumper 58 in a state in which the residual water removal mode is set in the robot cleaner 1, the collision detection sensor 121 detects the movement of the bumper 58, and transmits the detection signal to the control unit 110. When receiving the detection signal, the control unit 110 drives the water pump 143 so that residual water inside the robot cleaner 1 can flows to the bottom surface of the robot cleaner 1 through the water supply tube 142.

When water remains in the water container 141 of the robot cleaner 1, a user can remove the water by separating the water container 141 from the robot cleaner 1 to clean. However, since the water supply tube 142 is configured to be accommodated in the body 50 of the robot cleaner 1, the water remaining in the water supply tube 142 cannot be taken out by the user, and the water supply tube 142 is a configuration that cannot be separated by the user, so there is a problem that cleaning is impossible. In addition, the remaining water causes odor when the robot cleaner 1 is left unused for a long time.

However, according to the present invention, the user can remove all the water remaining in the robot cleaner 1 through the residual water removal mode described above. Through this, the user can more hygienically manage the robot cleaner 1.

On the other hand, the removal of residual water is repeated whenever a pressing operation of the bumper 58 is detected until the robot cleaner 1 is released from the residual water removal mode (S4234). When the external control device 5 generates and transmits a control signal for canceling the residual water removal mode based on a user input, the residual water removal mode is released. When the residual water removal mode is released, the water pump 143 does not operate even if the pressing operation of the bumper 58 is detected.

FIG. 12 is a conceptual diagram of a robot cleaning system according to another embodiment of the present invention, and FIG. 13 is a method for performing a cooperative cleaning operation in conjunction with other cleaner in a control method of a robot cleaning system according to another embodiment of the present invention. FIGS. 14*a* and 14*b* are views illustrating a control screen of an external control device for setting the cooperative cleaning operation in a robot cleaning system according to another embodiment of the present invention.

The robot cleaning system 1000*b* according to another embodiment of the present invention may include a robot cleaner 1*a*, other cleaner 2 to perform a cleaning operation in cooperation with the robot cleaner, and an external control device 5.

The robot cleaner 1*a* may have the same configuration as the robot cleaner 1 of the robot cleaning system 1000*a* according to an embodiment of the present invention. The other cleaner 2 may be a cleaner that performs a cleaning operation by sucking dust, a robot cleaner that drives autonomously, or a wired/wireless type stick cleaner operated by a user directly. The external control device 5 may have the same configuration as the external control device 5 of the robot cleaning system 1000*a* according to an embodiment of the present invention.

Referring to FIG. 13, the external control device 5 receives the user input selecting other robot cleaner 2 on the control screen (S5100).

Referring to FIG. 14*a*, an interlocking operation item C40 for cooperatively performing the cleaning operation by interlocking a plurality of cleaning periods may be displayed on the control screen of the external control device 5. When the external control device 5 receives the user input selecting the interlocking operation item C40, a screen for selecting an interlocking product may be displayed on the external control device 5.

Referring to FIG. 14*b*, the user may select a cleaner to be interlocked with the robot cleaner 1*a* among a plurality of registered cleaners C42*a*, C42*b*, and C42*c* displayed on the screen for selecting a product to be interlocked. For example, the user may select the stick cleaner 1 C42*b*.

The control unit 580 of the external control device 5 receives the user input selecting the other cleaner 2 and generates the control signal for interlocking a plurality of cleaning periods, and transmits it to the robot cleaner 1*a* and the selected other cleaner 2 (S5200).

In a state in which the other cleaner 2 interlocked with the robot cleaner 1*a* receives the control signal for interlocking the plurality of cleaning periods (S5300), when the cleaning operation is started (S5400) and the cleaning operation is completed (S5500), the other cleaner 2 generates the completion signal of the cleaning operation and transmits it to the robot cleaner 1*a* at the same time as completion of the cleaning operation (S5600).

When the robot cleaner 1*a* receives the completion signal of the cleaning operation transmitted by the other cleaner 2 through the communication unit 160 (S5700), the control unit 110 of the robot cleaner 1*a* controls the robot cleaner 1*a* to start the cleaning operation (S5800).

In this way, since the robot cleaner 1*a* can immediately perform the wet mop cleaning in conjunction with a plurality of cleaning periods after the cleaning operation for sucking dust is completed, the wet mop cleaning can be started without the user's separate control, so user convenience can be further increased.

As described above, the robot cleaner according to an embodiment of the present invention can control a water pump to supply the water supply amount set by a user to a mop, and thus, the water supply amount supplied to the mop of the robot cleaner can be differently controlled depending on a cleaning environment, thereby increasing user convenience.

In addition, in the robot cleaner according to the present invention, when a wet mode is set in the robot cleaner, the water supply amount to be supplied to the mop is determined based on the moisture content of the mop coupled to the robot cleaner, and accordingly, the water pump is controlled. Thus, it is possible to quickly wet the mop at the beginning of the cleaning operation and thus cleaning efficiency is increased.

In addition, the robot cleaner according to the present invention can hygienically manage the robot cleaner by controlling the water pump to discharge the residual water inside the robot cleaner when the residual water removal mode is set in the robot cleaner.

On the other hand, the robot cleaning system and the method thereof according to the present invention include an external control device that receives a user input and displays a control screen for setting the water supply amount, and thus, the user can conveniently and remotely control the robot cleaner according to a cleaning environment.

In addition, the robot cleaning system and method thereof according to the present invention include an external control device that receives a user input and displays a control screen for setting a wet mode on the robot cleaner, and thus, the user can conveniently and remotely set the wet mode.

In addition, the robot cleaning system and the method thereof according to the present invention include an external control device that receives a user input and displays a control screen for setting a residual water removal mode on the robot cleaner, and thus, the user can conveniently and remotely control the residual water removal mode.

Meanwhile, the block diagrams disclosed in the present disclosure may be interpreted by those of ordinary skill in the art as a form conceptually expressing a circuit for implementing the principles of the present disclosure. Similarly, it will be appreciated by those of ordinary skill in the art that any flow charts, flow diagrams, state transition diagrams, pseudocode, etc. may be represented substantially on a computer-readable medium, and represent a variety of processes that may be executed by such a computer or processor, whether or not explicitly shown.

Accordingly, the above-described embodiments of the present disclosure can be written in a program that can be executed on a computer, and can be implemented in a general-purpose digital computer operating the program using a computer-readable recording medium. The computer-readable recording medium may include a storage medium such as a magnetic storage medium (for example, a ROM, a floppy disk, a hard disk, etc.), an optically readable medium (for example, a CD-ROM, a DVD, etc.), and the like.

The functions of the various elements shown in the drawings may be provided through the use of dedicated hardware as well as hardware capable of executing software in association with appropriate software. When provided by a processor, such function may be provided by a single dedicated processor, a single shared processor, or a plurality of separate processors, some of which may be shared.

In addition, the explicit use of the terms "processor" or "control unit" should not be construed as referring exclusively to hardware capable of executing software, and without limitation, digital signal processor (DSP) hardware, read only memory (ROM) for storing software, random access memory (RAM), and non-volatile storage may be implicitly included.

In the foregoing, a specific embodiment of the present invention has been described and illustrated, but the present invention is not limited to the described embodiment, and it will be understood by those skilled in the art that various modifications and variations can be made in other specific embodiments without departing from the spirit and scope of the present invention.

Accordingly, the scope of the present invention should not be determined by the described embodiment, but should be determined by the technical idea described in the claims.

DESCRIPTION OF REFERENCE NUMERALS

1000*a*, 1000*b*: robot cleaning system
1: robot cleaner
2: other cleaner
5: external control device
10: first rotation plate
20: second rotation plate
30: first mop
40: second mop
50: body
56: first motor
57: second motor
58: bumper
121: collision detection sensor
141: water container
142: water supply tube
143: water pump

The invention claimed is:

1. A robot cleaner that autonomously cleans a surface, the robot cleaner comprising:

a body;

a mop coupled to the body;

a water container detachably coupled to one side of the body; and a water pump coupled to the water container to supply water to the mop through a water supply tube, wherein the water pump is controlled based on a control signal input by a user through an external control device, wherein at least one of the control signals is a control signal that sets a water supply amount to be changed, and the water pump automatically supplies water based on the changed water supply amount, and wherein a warning message is displayed on a display of the external control device, when the water supply amount set by the external control device is equal to or greater than a predetermined threshold at which water flows from the mop to the surface.

2. The robot cleaner according to claim 1, wherein when the control signal is for setting the water supply amount, a driving time of the water pump is controlled to supply the set water supply amount to the mop based on the control signal.

3. The robot cleaner according to claim 1, wherein when the control signal is for setting a wet mode of the mop, the water pump is controlled according to a comparison result of comparing a first moisture content corresponding to a preset target water supply amount to a second moisture content that is a current moisture content of the mop when a cleaning operation of the robot cleaner starts.

4. The robot cleaner according to claim 3, wherein when the second moisture content is less than the first moisture content, the water pump is controlled to supply a larger amount of water than the target water supply amount to the mop, and wherein when the second moisture content is equal to or greater than the first moisture content, the water pump is controlled to supply the target water supply amount to the mop.

5. The robot cleaner according to claim 3, further comprising:

a rotation plate coupled to a bottom surface of the body and connected to the mop; and a driving motor connected to the rotation plate to drive rotation of the rotation plate, wherein the second moisture content is determined based on a current of the driving motor.

6. The robot cleaner according to claim 1, further comprising:

a bumper coupled to an outer surface of the body at a side opposite to the one side of the body to which the water container is coupled; and a collision detection sensor coupled to the body, the collision detection sensor being configured to detect a movement of the bumper with respect to the body, wherein when the control signal input through the external control device is a control signal for setting a residual water removal mode for removing liquid remaining inside the robot cleaner, the water pump is controlled to be driven whenever a pressing motion of the bumper is detected through the collision detection sensor.

7. A robot cleaning system comprising:

a robot cleaner configured to autonomously clean a surface, the robot cleaner including:

a body;

a mop coupled to the body;

a water container coupled to the body; and a water pump coupled to the water container to supply water to the mop through a water supply tube; and an external control device including a display for displaying a control screen, the external control device being configured to:

generate a control signal to control the water pump based on a user input inputted through the control screen; and transmit the control signal to the robot cleaner, wherein at least one of the control signals is a control signal that sets a water supply amount to be changed, and the water pump automatically supplies water based on the changed water supply amount, and wherein a warning message is displayed on the control screen, when the water supply amount set by the external control device is equal to or greater than a predetermined threshold at which water flows from the mop to the surface.

8. The robot cleaning system according to claim 7, wherein the external control device is configured to display, on the control screen of the display, a slider, wherein the slider is a horizontal bar-shaped graphic user interface (GUI) object that is movable by sliding a target point left and right by a touch input by a user, and wherein the slider includes:

a first color displayed from a preset point of the slider to a right end point corresponding to a maximum water supply amount;

a second color displayed from the preset point to a left end point; and the water supply amount to be supplied to the robot cleaner, that is set by the touch input.

9. The robot cleaning system according to claim 8, wherein the external control device is configured to convert an entirety of the slider to the first color and display the warning message below the slider, in response to the target point being slid by the touch input between the preset point and the right end point corresponding to the maximum water supply amount on the control screen.

10. The robot cleaning system according to claim 8, wherein the control signal corresponds to information on the set water supply amount.

11. The robot cleaning system according to claim 7, wherein the external control device is configured to:
display a mop wet item for setting a wet mode of the mop on the control screen, and
generate the control signal for setting the wet mode to the robot cleaner and transmit the control signal to the robot cleaner in response to receiving the user input for selecting the mop wet item.

12. The robot cleaning system according to claim 7, wherein the external control device is configured to:
display a residual water removal mode item for setting a residual water removal mode on the control screen, and
generate the control signal for setting the residual water removal mode to the robot cleaner and transmit the control signal to the robot cleaner in response to receiving the user input for selecting the residual water removal mode item.

13. The robot cleaning system according to claim 7, wherein the robot cleaner is a first robot cleaner,
wherein the robot cleaning system further includes a second robot cleaner configured to perform a cleaning operation in cooperation with the first robot cleaner, and
wherein the first robot cleaner starts a cleaning operation by receiving a cleaning completion signal transmitted after the second robot cleaner completes cleaning, in response to the external control device receiving the user input for selecting the second robot cleaner on the control screen.

14. A control method of a robot cleaning system, the robot cleaning system including:
a robot cleaner configured to autonomously clean a surface, the robot cleaner including:
a body;
a mop coupled to the body;
a water container coupled to the body; and
a water pump coupled to the water container to supply water to the mop through a water supply tube; and
an external control device including a display for displaying a control screen, the control method comprising:
receiving, by the external control device, a user input through the control screen;
generating, by the external control device, a control signal for controlling the water pump based on the user input;
transmitting, by the external control device, the control signal to the robot cleaner; and
receiving, by the robot cleaner, the control signal and controlling the water pump according to the control signal,
wherein at least one of the control signals is a control signal that sets a water supply amount to be changed, and the water pump automatically supplies water based on the changed water supply amount, and
wherein a warning message is displayed on the control screen, when the water supply amount set by the external control device is equal to or greater than a predetermined threshold at which water flows from the mop to the surface.

15. The control method according to claim 14, wherein the user input is for setting the water supply amount, and
wherein the controlling the water pump of the robot cleaner includes controlling a driving time of the water pump to supply the set water supply amount to the mop.

16. The control method according to claim 14, wherein the user input is for setting a wet mode of the mop, and
wherein the controlling the water pump of the robot cleaner includes:
determining a first moisture content corresponding to a target water supply amount preset in the robot cleaner;
determining a second moisture content that is a current moisture content of the mop at a same time as a start of a cleaning operation;
comparing the first moisture content with the second moisture content; and
controlling the water pump according to a result of the comparison.

17. The control method according to claim 14, wherein the robot cleaner further includes:
a bumper coupled to an outer surface of the body at a side opposite to one side of the body to which the water container is coupled; and
a collision detection sensor coupled to the body, the collision detection sensor detecting a movement of the bumper with respect to the body,
wherein the user input is for setting a residual water removal mode for removing liquid remaining inside the robot cleaner, and
wherein the controlling the water pump includes operating the water pump until residual water inside the robot cleaner is removed through the water supply tube, in response to a pressing operation of the bumper being detected through the collision detection sensor.

18. The control method according to claim 14, wherein the external control device displays, on the control screen, a slider,
wherein the slider is a horizontal bar-shaped graphic user interface (GUI) object that is movable by sliding a target point left and right by a user's touch input, and
wherein the slider includes:
a first color displayed from a preset point of the slider to a right end point corresponding to a maximum water supply amount;
a second color displayed from the preset point to a left end point; and
the water supply amount to be supplied to the robot cleaner, that is set by the touch input.

19. The control method according to claim 18, wherein the external control device converts an entirety of the slider to the first color and displays the warning message below the slider, in response to the target point being slid by the touch input between the preset point and the right end point corresponding to the maximum water supply amount on the control screen.

20. The control method according to claim 19, wherein the external control device displays a mop wet item for setting a wet mode of the mop on the control screen, generates the control signal for setting the wet mode to the robot cleaner and transmits the control signal to the robot cleaner, in response to receiving the user input for selecting the mop wet item.

* * * * *